(12) United States Patent
Bilobrov et al.

(10) Patent No.: US 11,030,462 B2
(45) Date of Patent: Jun. 8, 2021

(54) SYSTEMS AND METHODS FOR STORING CONTENT

(71) Applicant: Facebook, Inc., Menlo Park, CA (US)

(72) Inventors: Sergiy Bilobrov, Santa Clara, CA (US); Maksim Khadkevich, San Francisco, CA (US); Eran Ambar, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 165 days.

(21) Appl. No.: 15/396,029

(22) Filed: Dec. 30, 2016

(65) Prior Publication Data

US 2017/0371930 A1    Dec. 28, 2017

Related U.S. Application Data

(60) Provisional application No. 62/355,043, filed on Jun. 27, 2016.

(51) Int. Cl.
*G06K 9/00* (2006.01)
*G06F 16/71* (2019.01)
(Continued)

(52) U.S. Cl.
CPC ..... *G06K 9/00744* (2013.01); *G06F 16/2228* (2019.01); *G06F 16/2237* (2019.01);
(Continued)

(58) Field of Classification Search
CPC .......... G06K 9/00744; G06F 17/30321; G06F 16/71; G06F 16/783
See application file for complete search history.

(56) References Cited

U.S. PATENT DOCUMENTS 8,065,248 B1    11/2011    Baluja
8,094,872 B1    1/2012    Yagnik
(Continued)

FOREIGN PATENT DOCUMENTS

CN    102132341 A    7/2011
CN    102460470 A    5/2012
(Continued)

OTHER PUBLICATIONS

Zhang, Weigang et al., "Web Video Thumbnail Recommendation with Content-Aware Analysis and Query-Sensitive Matching," Multimedia Tools and Applications, vol. 73, No. 1, pp. 547-571, Nov. 2014 [published online Jul. 24, 2013].
(Continued)

*Primary Examiner* — Hosain T Alam
*Assistant Examiner* — Anthony G Gemignani
(74) *Attorney, Agent, or Firm* — Sheppard Mullin Richter & Hampton LLP

(57) ABSTRACT

Systems, methods, and non-transitory computer-readable media can store fingerprint data corresponding to one or more content items in an index data structure, the index data structure comprising a set of bins, wherein at least one first bin references a list of fingerprinted frames, and wherein at least one fingerprinted frame in the list corresponds to a first content item. A determination is made that one or more fingerprinted frames corresponding to a second content item are to be added to the index data structure. At least one of the fingerprinted frames corresponding to the second content item are added to the list of fingerprinted frames that is referenced by the first bin.

17 Claims, 16 Drawing Sheets

(51) Int. Cl.

| | | |
|---|---|---|
| *G06F 16/783* | (2019.01) | |
| *G06F 16/22* | (2019.01) | |
| *G06K 9/46* | (2006.01) | |
| *H04N 21/2187* | (2011.01) | |
| *H04N 21/234* | (2011.01) | |
| *G06F 16/2455* | (2019.01) | |
| *H04N 21/233* | (2011.01) | |
| *H04N 21/8358* | (2011.01) | |

(52) U.S. Cl.
CPC ...... *G06F 16/2255* (2019.01); *G06F 16/2455* (2019.01); *G06F 16/71* (2019.01); *G06F 16/783* (2019.01); *G06F 16/785* (2019.01); *G06K 9/00751* (2013.01); *G06K 9/4604* (2013.01); *G06K 9/4633* (2013.01); *G06K 9/4652* (2013.01); *G06K 9/4671* (2013.01); *H04N 21/2187* (2013.01); *H04N 21/233* (2013.01); *H04N 21/23418* (2013.01); *H04N 21/8358* (2013.01)

(56) References Cited

U.S. PATENT DOCUMENTS

| | | | |
|---|---|---|---|
| 8,364,703 B2 | 1/2013 | Ramanathan | |
| 8,611,422 B1 | 12/2013 | Yagnik | |
| 8,634,947 B1 | 1/2014 | Kleinpeter et al. | |
| 8,635,211 B2 | 1/2014 | Jiang et al. | |
| 8,655,029 B2 | 2/2014 | Shiell | |
| 8,700,194 B2 | 4/2014 | Bauer et al. | |
| 8,805,560 B1 | 8/2014 | Tzanetakis | |
| 8,838,609 B1* | 9/2014 | Sharifi | G06F 16/951 707/747 |
| 8,868,223 B1* | 10/2014 | Sharifi | G01S 5/24 700/94 |
| 8,938,089 B1 | 1/2015 | Postelnicu | |
| 8,953,836 B1* | 2/2015 | Postelnicu | G06K 9/00758 382/100 |
| 9,135,674 B1 | 9/2015 | Yagnik | |
| 9,177,350 B1 | 11/2015 | Ioffe | |
| 9,258,604 B1 | 2/2016 | Bilobrov | |
| 9,529,840 B1 | 12/2016 | Granstrom | |
| 9,549,125 B1 | 1/2017 | Goyal | |
| 9,684,715 B1 | 6/2017 | Ross | |
| 2003/0061490 A1 | 3/2003 | Abajian | |
| 2003/0228030 A1 | 12/2003 | Wendt | |
| 2005/0198285 A1 | 9/2005 | Petit | |
| 2006/0075237 A1 | 4/2006 | Seo et al. | |
| 2007/0128899 A1 | 6/2007 | Mayer | |
| 2007/0250863 A1 | 10/2007 | Ferguson | |
| 2010/0007797 A1 | 1/2010 | Stojancic | |
| 2010/0049711 A1 | 2/2010 | Singh | |
| 2010/0061587 A1 | 3/2010 | Gupta | |
| 2010/0071016 A1 | 3/2010 | Uhm et al. | |
| 2010/0303338 A1 | 12/2010 | Stojancic | |
| 2010/0306193 A1 | 12/2010 | Pereira et al. | |
| 2010/0325117 A1 | 12/2010 | Sharma | |
| 2011/0026761 A1 | 2/2011 | Radhakrishnan et al. | |
| 2011/0116719 A1* | 5/2011 | Bilobrov | G06K 9/3233 382/217 |
| 2011/0161076 A1 | 6/2011 | Davis et al. | |
| 2011/0222782 A1 | 9/2011 | Kishiwagi | |
| 2011/0276993 A1 | 11/2011 | Ferguson | |
| 2012/0078894 A1 | 3/2012 | Jiang | |
| 2012/0183173 A1 | 7/2012 | Li | |
| 2012/0191695 A1* | 7/2012 | Xia | G06F 17/30241 707/711 |
| 2012/0215789 A1 | 8/2012 | Ramanathan | |
| 2012/0218471 A1 | 8/2012 | Gratton | |
| 2012/0278326 A1 | 11/2012 | Bauer | |
| 2012/0311074 A1 | 12/2012 | Arini | |
| 2013/0054645 A1 | 2/2013 | Bhagavathy | |
| 2013/0177252 A1 | 7/2013 | Hefeeda et al. | |
| 2013/0197913 A1 | 8/2013 | Bilobrov | |
| 2013/0259361 A1* | 10/2013 | Singh | G06K 9/00744 382/154 |
| 2013/0266195 A1 | 10/2013 | Shiell | |
| 2013/0276033 A1 | 10/2013 | Francini | |
| 2013/0276138 A1 | 10/2013 | Schmelzer | |
| 2013/0318071 A1 | 11/2013 | Cho | |
| 2014/0105447 A1 | 4/2014 | Samari et al. | |
| 2014/0161263 A1 | 6/2014 | Koishida | |
| 2014/0236952 A1 | 8/2014 | Seet et al. | |
| 2014/0236988 A1 | 8/2014 | Harron | |
| 2014/0277640 A1 | 9/2014 | Bilobrov | |
| 2014/0277641 A1 | 9/2014 | Bilobrov | |
| 2014/0278845 A1 | 9/2014 | Teiser | |
| 2014/0279856 A1* | 9/2014 | Srinivasan | G06F 17/30345 707/609 |
| 2015/0039646 A1 | 2/2015 | Sharifi | |
| 2015/0104023 A1 | 4/2015 | Bilobrov | |
| 2015/0110340 A1 | 4/2015 | Harron | |
| 2015/0143519 A1 | 5/2015 | Granstrom | |
| 2015/0199974 A1 | 7/2015 | Bilobrov | |
| 2015/0242399 A1 | 8/2015 | Ramanathan | |
| 2015/0302039 A1 | 10/2015 | Yaacob | |
| 2015/0356178 A1* | 12/2015 | Scherf | G06F 17/30784 707/769 |
| 2015/0381628 A1* | 12/2015 | Steinberg | H04L 63/10 726/4 |
| 2016/0037190 A1 | 2/2016 | Khader | |
| 2016/0125889 A1 | 5/2016 | Westerman | |
| 2016/0148620 A1 | 5/2016 | Bilobrov | |
| 2016/0156731 A1* | 6/2016 | Wang | G06F 17/30861 709/217 |
| 2016/0249093 A1 | 8/2016 | Stojancic et al. | |
| 2016/0306811 A1 | 10/2016 | Cao | |
| 2016/0350415 A1 | 12/2016 | Kalinina | |
| 2016/0366517 A1 | 12/2016 | Chandran et al. | |
| 2017/0171609 A1 | 6/2017 | Koh | |
| 2017/0251249 A1 | 8/2017 | Seo | |
| 2018/0213269 A1 | 7/2018 | Ioffe | |
| 2019/0080177 A1 | 3/2019 | Xu | |
| 2019/0182541 A1 | 6/2019 | Seo | |

FOREIGN PATENT DOCUMENTS

| | | |
|---|---|---|
| CN | 103729368 A | 4/2014 |
| EP | 2388721 | 11/2011 |
| JP | 2005529526 | 9/2005 |
| JP | 2006285907 A | 10/2006 |
| JP | 2009147603 A | 7/2009 |
| JP | 2009302723 A | 12/2009 |
| JP | 2010074832 A | 4/2010 |
| JP | 2010186307 A | 8/2010 |
| JP | 2011188342 A | 9/2011 |
| JP | 2011243204 | 12/2011 |
| JP | 2012529704 | 11/2012 |
| JP | 2013529408 | 7/2013 |
| JP | 2014519759 | 8/2014 |
| WO | 2006018790 | 2/2006 |
| WO | 2010144206 | 12/2010 |
| WO | 2014047337 | 3/2014 |
| WO | 2015183148 | 12/2015 |

OTHER PUBLICATIONS

Esmaeili, Mani Malek et al., "A Robust and Fast Video Copy Detection System Using Content-Based Fingerprinting," IEEE Transactions on Information Forensics and Security, vol. 6, No. 1, pp. 213-226, Mar. 2011.

Gilad, Ori et al., "YouTube Content ID," YouTube video, https://www.youtube.com/watch?v=9g2UI2SsRns, Sep. 28, 2010.

Lu, Jian, "Video Fingerprinting for Copy Identification: From Research to Industry Applications," SPIE Media Forensics and Security XI, vol. 7254, Jan. 2009.

LV, Qin et al., "Multi-Probe LSH: Efficient Indexing for High-Dimensional Similarity Search," Proceedings of the 33rd International Conference on Very Large Data Bases (VLDB '07), pp. 950-961, Sep. 2007.

(56) References Cited

OTHER PUBLICATIONS

Oostveen, Job et al., "Feature Extraction and a Database Strategy for Video Fingerprinting," Recent Advances in Visual Information Systems, Lecture Notes in Computer Science, vol. 2314, 2002.
European Patent Application No. 16207149.2, Search Report dated Jul. 13, 2017.
European Patent Application No. 16207150.0, Search Report dated Jul. 13, 2017.
European Patent Application No. 16207152.6, Search Report dated Jul. 13, 2017.
European Patent Application No. 17155187.2, Search Report dated Jul. 20, 2017.
International Application No. PCT/US2016/057979 filed Oct. 20, 2017.
U.S. Appl. No. 62/084,494, filed Nov. 25, 2014.
International Application No. PCT/US2016/056525, International Search Report and Written Opinion dated Mar. 27, 2017.
International Application No. PCT/US2016/056556, International Search Report and Written Opinion dated Apr. 28, 2017.
International Application No. PCT/US2016/056620, International Search Report and Written Opinion dated Feb. 17, 2017.
International Application No. PCT/US2016/057979, International Search Report and Written Opinion dated Mar. 27, 2017.
International Application No. PCT/US2016/057982, International Search Report and Written Opinion dated Mar. 27, 2017.
International Application No. PCT/US2016/057985, International Search Report and Written Opinion dated Feb. 17, 2017.
International Application No. PCT/US2016/069551, International Search Report and Written Opinion dated Apr. 24, 2017.
Jiang, Menglin et al., "Video Copy Detection Using a Soft Cascade of Multimodal Features," 2012 IEEE International Conference on Multimedia and Expo (ICME), pp. 374-379, Jul. 9, 2012.
Norouzi, Mohammad et al., "Fast Search in Hamming Space with Multi-Index Hashing," 2012 IEEE Conference on Computer Vision and Pattern Recognition (CVPR), pp. 3108-3115, Jun. 16, 2012.
International Application No. PCT/US2016/056525, filed Oct. 12, 2016.
Japanese Application No. 2019-519957, Search Report dated Sep. 8, 2020, 4 pages.
Japanese Application No. 2019-519956, Office Action dated Nov. 4, 2020, 5 pages.
Japanese Application No. 2019-519958, Office Action dated Nov. 17, 2020, 5 pages.
Japanese Application No. 2019-519960, Office Action dated Jan. 26, 2021, with English translation, 8 pages.

* cited by examiner

1100

```
Evaluate at least one portion of a test content item with at least
one portion of a reference content item using one or more first
fingerprints of the test content item and one or more first
fingerprints of the reference content item, wherein the first
fingerprints correspond to a first type of media
1102
```

↓

```
Determine that at least one verification criteria is satisfied
1104
```

↓

```
Evaluate the portion of the test content with the portion of the
reference content using one or more second fingerprints of the test
content item and one or more second fingerprints of the reference
content item, wherein the second fingerprints correspond to a
second type of media that is different from the first type of media
1106
```

FIGURE 11

SYSTEMS AND METHODS FOR STORING CONTENT

CROSS-REFERENCE TO RELATED APPLICATIONS

This application claims priority to U.S. Provisional Patent Application No. 62/355,043, filed on Jun. 27, 2016 and entitled "SYSTEMS AND METHODS FOR IDENTIFYING MATCHING CONTENT", which is incorporated in its entirety herein by reference.

FIELD OF THE INVENTION

The present technology relates to the field of content matching. More particularly, the present technology relates to techniques for identifying matching content items.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

SUMMARY

Various embodiments of the present disclosure can include systems, methods, and non-transitory computer readable media configured to store fingerprint data corresponding to one or more content items in an index data structure, the index data structure comprising a set of bins, wherein at least one first bin references a list of fingerprinted frames, and wherein at least one fingerprinted frame in the list corresponds to a first content item. A determination is made that one or more fingerprinted frames corresponding to a second content item are to be added to the index data structure. At least one of the fingerprinted frames corresponding to the second content item are added to the list of fingerprinted frames that is referenced by the first bin.

In an embodiment, the systems, methods, and non-transitory computer readable media are configured to identify the first bin based at least in part on a portion of bits that correspond to the at least one fingerprinted frame of the second content item, the at least one fingerprinted frame being represented using a set of bits and store data describing the at least one fingerprinted frame in the list of fingerprinted frames.

In an embodiment, the systems, methods, and non-transitory computer readable media are configured to determine that the index data structure is storing fingerprinted frames for the specified number of content items and remove fingerprinted frames corresponding to an identified content item from the index data structure to create space for the second content item.

In an embodiment, the systems, methods, and non-transitory computer readable media are configured to determine that the identified content item is no longer available for access by users through the computing system.

In an embodiment, the systems, methods, and non-transitory computer readable media are configured to determine that one or more fingerprinted frames corresponding to the identified content item have been stored in the index data structure for a threshold period of time.

In an embodiment, the systems, methods, and non-transitory computer readable media are configured to determine that the identified content item has a popularity value that is below a threshold popularity value.

In an embodiment, the popularity value is determined based at least in part on one of: a number of matches between one or more fingerprinted frames of the identified content item and fingerprinted frames of one or more test content items, a number of times the identified content item was accessed by users of the computing system, or a number of times users have engaged with the identified content item.

In an embodiment, the systems, methods, and non-transitory computer readable media are configured to perform a re-ordering of the list of fingerprinted frames that are referenced by the first bin.

In an embodiment, the list is re-ordered so that the fingerprinted frames are ordered based on their respective popularity values.

In an embodiment, the popularity value of a fingerprinted frame is determined based at least in part on a number of times the fingerprinted frame matched one or more fingerprinted frames of one or more test content items.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 11 illustrates an example process for matching content using different types of fingerprints, according to various embodiments of the present disclosure.

Figure 1:
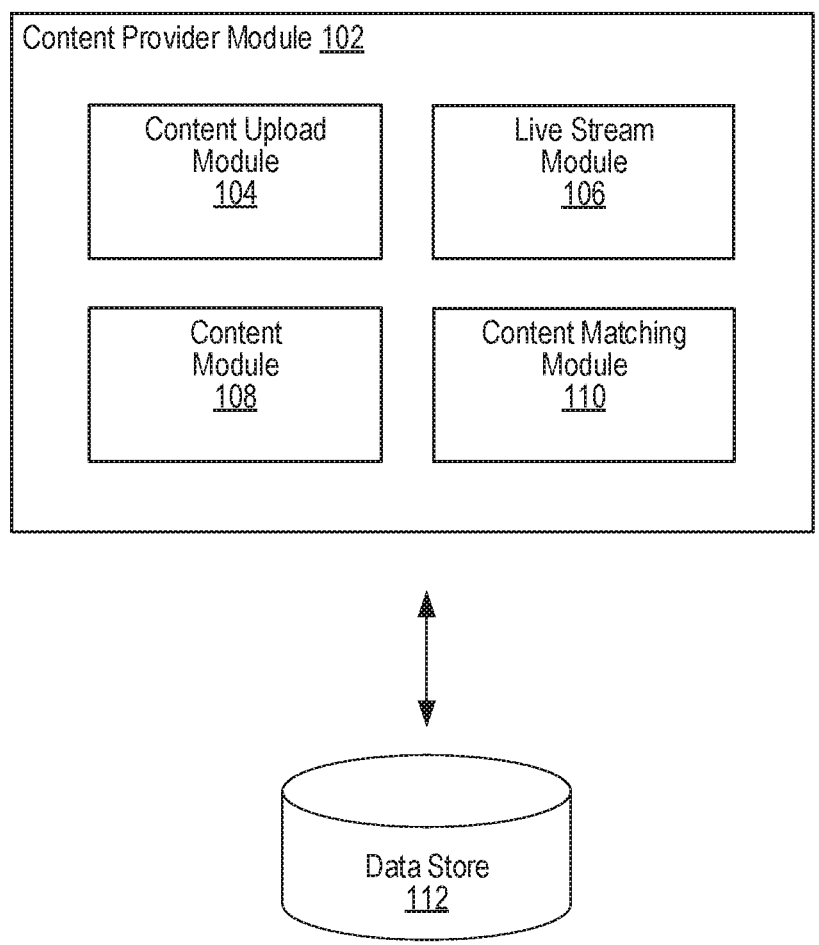
FIG. 1 illustrates an example system including an example content provider module configured to provide access to various content items, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Identifying Matching Content

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, content may be broadcast through a content provider. For example, such content providers may broadcast content through various broadcast mediums (e.g., television, satellite, Internet, etc.). In one example, a broadcast can include content that is being captured and streamed live by a publisher. For example, a publisher can provide content (e.g., live concert, TV show premiere, etc.) to be broadcasted as part of a live content stream. Such events can be captured using, for example, video capture devices (e.g., video cameras) and/or audio capture devices (e.g., microphones). This captured content can then be encoded and distributed to user devices over a network (e.g., the Internet) in real-time by a content provider (e.g., a social networking system). In some instances, an unauthorized entity may capture a copy of the publisher's live content stream and stream the copied content through the content provider as part of a separate live content stream. For example, this entity may record a video of the publisher's live content stream as the content is being presented on a television display. In another example, the unauthorized entity may capture a stream of the event being broadcasted through a different medium (e.g., satellite, etc.) and publish the captured stream through the content provider.

Under conventional approaches, it can be difficult to detect such unauthorized live content streams and this difficulty can be especially problematic when the live content streams contain copyrighted content. For example, under conventional approaches, a content provider would typically check whether a content item is infringing a copyrighted content item after the content item has been uploaded to the content provider in its entirety. The content provider would then analyze the uploaded content item against the copyrighted content item to identify whether any portions match. While such approaches may be adequate for detecting copyright infringement in content items that are served on-demand, they are generally inadequate for detecting copyright infringement in content items that are being streamed live. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, a publisher can provide content to be streamed, or broadcasted, through a social networking system as part of a live content stream. The publisher can indicate that the live content stream is copyrighted and, based on this indication, the social networking system can generate fingerprints of the content as the content is streamed live. These fingerprints can be stored in a reference database, for example, and used for identifying duplicate content in other live content streams and/or on-demand content items. For example, as the publisher's content is being streamed live, the social networking system can determine whether any other live content streams and/or on-demand content items match the publisher's copyrighted live content stream either in whole or in part. Any portion of content items that match the publisher's live content stream may be violations of copyrights or other legal rights. In such instances, the unauthorized broadcasters and/or the publisher of the live content stream (e.g., copyright holder) can be notified about the possible copyright violations and appropriate action can be taken. In some embodiments, the infringing live content streams and/or on-demand content item posted by the unauthorized broadcaster is automatically made inaccessible through the social networking system.

FIG. 1 illustrates an example system 100 including an example content provider module 102 configured to provide access to various content items, according to an embodiment of the present disclosure. As shown in the example of FIG. 1, the content provider module 102 can include a content upload module 104. a live stream module 106, a content module 108, and a content matching module 110. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 or at least a portion thereof can be implemented as or within an application (e.g., app), a program, or an applet, etc., running on a user computing device or a client computing system, such as the user device 1410 of FIG. 14. In another example, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 1430 of FIG. 14.

The content provider module 102 can be configured to communicate and/or operate with the at least one data store 112, as shown in the example system 100. The at least one data store 112 can be configured to store and maintain various types of data. For example, the data store 112 can store information describing various content that is being streamed live through the social networking system or content items that have been posted by users of the social networking system. Such information can include, for example, fingerprints (e.g., bit sequences) that were generated for live content streams and for on-demand content items. In some implementations, the at least one data store 112 can store information associated with the social networking system (e.g., the social networking system 1430 of FIG. 14). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

The content provider module 102 can be configured to provide users with access to content items that are posted through a social networking system. For example, a user can interact with an interface that is provided by a software application (e.g., a social networking application) running on a computing device of the user. This interface can include an option for posting, or uploading, content items to the social networking system. When posting a content item, the content upload module 104 can be utilized to communicate data describing the content item from the computing device to the social networking system. Such content items may include text, images, audio, and videos, for example. The social networking system can then provide the content item through the social networking system including, for example, in one or more news feeds. In some embodiments, the interface can also include an option for live streaming content items through the social networking system. When initiating a live content stream, the live stream module 106 can be utilized to communicate data describing the content to be streamed live from the computing device to the social networking system. The live stream module 106 can utilize any generally known techniques that allow for live streaming of content including, for example, the Real Time Messaging Protocol (RTMP).

The interface provided by the software application can also be used to access posted content items, for example, using the content module 108. For example, the content module 108 can include content items in a user's news feed. Such content items may include on-demand content items (e.g., video on-demand or "VOD") as well as content that is being streamed live. In this example, the user can access content items while browsing the news feed. In another example, the user can access content items by searching, through the interface, for a content item, for the user that posted a content item, and/or using search terms that correspond to a content item. In one example, the user may select an option to view a live content stream and, in response, the social networking system can send data corresponding to the live content stream to a computing device of the user. In this example, the social networking system can continue sending data corresponding to the live content stream until, for example, the publisher of the live content stream discontinues streaming or if the user selects an option to discontinue the live content stream. The content matching module 110 can be configured to identify matches (e.g., copyright infringement) between content items that are being streamed live or are available on-demand through the social networking system. More details regarding the content matching module 110 will be provided below with reference to FIG. 2.

Figure 2:
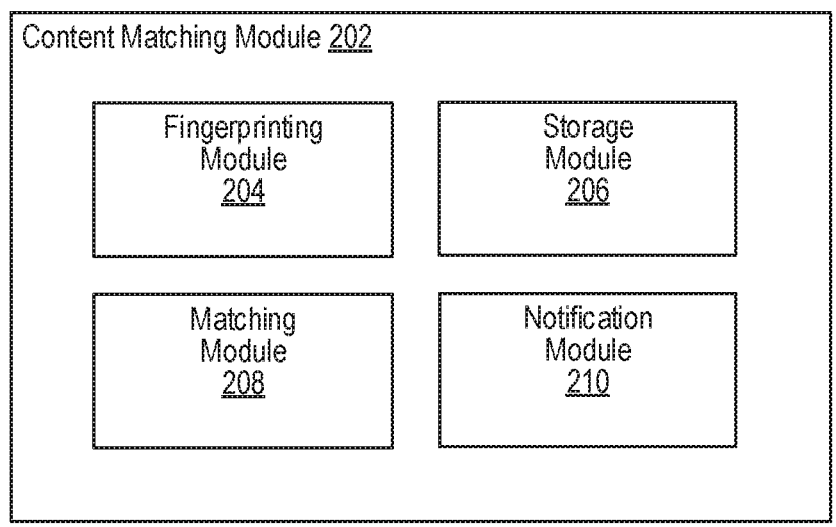
FIG. 2 illustrates an example of a content matching module, according to an embodiment of the present disclosure.

FIG. 2 illustrates an example of a content matching module 202, according to an embodiment of the present disclosure. In some embodiments, the content matching module 110 of FIG. 1 can be implemented as the content matching module 202. As shown in FIG. 2, the content matching module 202 can include a fingerprinting module 204, a storage module 206, a matching module 208, and a notification module 210.

In various embodiments, the fingerprinting module 204 is configured to determine, or obtain, respective fingerprints for content items. For example, a set of fingerprints for a live content stream may be determined as the stream is received by the social networking system. In another example, a set of fingerprints can be determined for a content item after the content item is uploaded to the social networking system. In some embodiments, a publisher that is live streaming or uploading a content item may select an option to indicate that the content item is protected, e.g., copyrighted. In such embodiments, the live content stream or uploaded content item can be fingerprinted and stored, for example, in a reference database (e.g., the data store 112 of FIG. 1), in response to the option being selected. The fingerprints stored in this reference database can be used to determine whether other content items that are available through the social networking system, either as live streams or videos on-demand, match (e.g., infringe) content that has been identified as being protected, e.g., copyrighted.

In some embodiments, the fingerprinting module 204 can obtain fingerprints for content items from one or more fingerprinting services that are each configured to determine fingerprints using one or more techniques. Such fingerprints may be determined, for example, using video data corresponding to the content item, audio data corresponding to the content item, or both. More details regarding the fingerprinting module 204 will be provided below with reference to FIG. 3.

The storage module 206 can be configured to manage the storage of information related to various content items. In various embodiments, the storage module 206 is configured to optimize the storage of fingerprints that are obtained, or generated, for content items. More details regarding the storage module 206 will be provided below with reference to FIG. 4.

In various embodiments, the matching module 208 is configured to determine a measure of relatedness between content items. Such measurements can be used to determine whether a content item (e.g., a live content stream and/or on-demand content item) matches, in whole or in part, any portions of a live content stream, any portions of content that were recently streamed live, and/or any portions of videos that are available on-demand through the social networking system. For example, the matching module 208 can determine that one or more portions (e.g., frames) of a protected live content stream match one or more portions (e.g., frames) of a candidate live stream. In some embodiments, the matching module 208 can be utilized to identify and segregate content items that include any content that has been flagged as including inappropriate or obscene content. More details regarding the matching module 208 will be provided below with reference to FIG. 5.

The notification module 210 can be configured to take various actions in response to any protected content being copied (e.g., copyright violations, potential or otherwise). For example, upon determining a threshold content match between a first content item (e.g., a protected live content stream) and a second content item (e.g., a candidate live content stream), the notification module 210 can notify the broadcaster of the candidate live content stream of the copying (e.g., potential copyright infringement). In some embodiments, the broadcaster has the option to end the candidate live content stream or to continue the live content stream. In such embodiments, by continuing the live content stream, the broadcaster is asserting its rights to stream the candidate live content stream. In some cases, if the broadcaster ends the candidate live content stream, then no action is needed from the publisher and, depending on the implementation, the publisher may or may not be notified of the broadcaster's live content stream. However, if the broadcaster decides to continue the candidate live content stream, then the notification module 210 can provide the publisher with information about the matching content. In some embodiments, the publisher can access an interface provided by the notification module 210 that identifies the respective portions of the candidate live content stream at which matches were found. The publisher can access the interface to playback the matching portions of the content items. The publisher can also access the interface to flag live content streams and/or uploaded content items as a copy violations (e.g., copyright violations), to take no action (e.g., due to fair use of the content item), or to grant authorization for use of the protected (e.g., copyrighted) portions, for example. In some embodiments, any live content streams and/or uploaded content items that were flagged as infringements of the publisher's protected content are made inaccessible to users through the social networking system. In some embodiments, the publisher can create match rules that specify various criteria to be satisfied before the publisher is notified of a match. For example, in some embodiments, the publisher can specify a match type (e.g., audio, video, video only, audio only, or both audio and video). In this example, the publisher is notified of a match provided the match satisfies the match type. In some embodiments, the publisher can specify a geographic region (e.g., specific cities, states, regions, countries, worldwide, etc.). In this example, the publisher is notified of a match provided the matching content originated from, or was broadcasted from, the specified geographic region. In some embodiments, the publisher can specify one or more match conditions and actions to be performed should those conditions be satisfied. One example match condition involves setting a match time duration. In this example, the publisher can be notified if the time length of matching content satisfies (e.g., is greater than, equal to, or less than) the match time duration. In some embodiments, the publisher can specify a match length (e.g., number of frames) and be notified if the matching content satisfies the specified match length. In some embodiments, the publisher can specify one or more approved, or whitelisted, users and/or pages that are permitted to use the publisher's protected content. In such embodiments, the publisher is notified if the matching content was posted by any user or page that is not approved or whitelisted. In some embodiments, the publisher can blacklist users and/or pages and be notified if the matching content originates from the blacklisted users and/or is broadcasted through blacklisted pages. In some embodiments, the publisher can specify one or more actions to be performed when match rules is satisfied. For example, the publisher can specify that no action should be taken against a match that satisfies a certain rule or rules. In another example, the publisher can indicate that a notification, or report, should be sent to the publisher when a match satisfies a certain rule or rules. The match rules and conditions described above are provided as examples and, in some embodiments, the publisher can create match rules using other constraints. In general, any of the example match rules and/or conditions described above can be combined with other rules and/or conditions.

Figure 3:
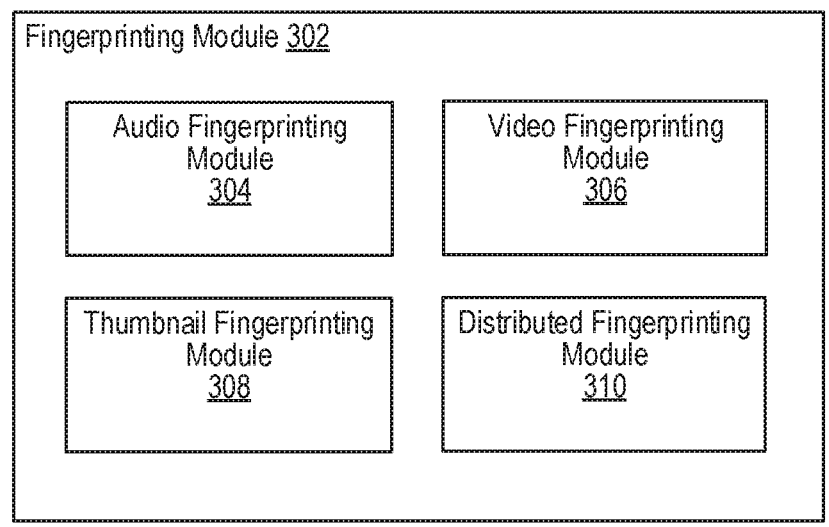
FIG. 3 illustrates an example of a fingerprinting module, according to an embodiment of the present disclosure.

FIG. 3 illustrates an example of a fingerprinting module 302, according to an embodiment of the present disclosure. In some embodiments, the fingerprinting module 204 of FIG. 2 can be implemented as the fingerprinting module 302. As shown in FIG. 3, the fingerprinting module 302 can include an audio fingerprinting module 304, a video fingerprinting module 306, a thumbnail fingerprinting module 308, and a distributed fingerprinting module 310.

The audio fingerprinting module 304 can be configured to obtain, or generate, audio fingerprints for content items. Such audio fingerprints can be generated using a variety of generally known techniques. In some embodiments, the audio fingerprinting module 304 obtains, or generates, audio fingerprints from an audio signal that corresponds to a content item. The audio signal may be composed of one or more discrete audio frames that each correspond to a portion of the audio signal at some time. Each audio frame can correspond to a portion of the audio signal over some length of time (e.g., 32 milliseconds, 64 milliseconds, 128 milliseconds, etc.). In some embodiments, each audio frame corresponds to a fixed length of time. For example, each audio frame can represent some portion of the audio signal and be 64 milliseconds in length. Some examples of features that may be extracted from the audio signal can include acoustic features in a frequency domain (e.g., spectral features computed on the magnitude spectrum of the audio signal), Mel-frequency cepstral coefficients (MFCC) of the audio signal, spectral bandwidth and spectral flatness measure of the audio signal, a spectral fluctuation, extreme value frequencies, and silent frequencies of the audio signal. The audio features extracted from the audio signal may also include features in a temporal domain, such as the mean, standard deviation and the covariance matrix of feature vectors over a texture window of the audio signal. Other features may be extracted separately, or in addition to, the examples described above including, for example, volume changes of the audio signal over some period of time as well as a compression format of the audio signal if the audio signal is compressed.

The audio fingerprinting module 304 can generate an audio fingerprint from one or more of the audio frames of the audio signal. In some embodiments, an audio fingerprint corresponding to some portion of the audio signal is generated based on various acoustic and/or perceptual characteristics captured by the portion of the audio signal. The audio fingerprint computed for a frame can be represented as a set of bits (e.g., 32 bits, 64 bits, 128 bits, etc.) that represent the waveform, or frame, to which the audio fingerprint corresponds. In some embodiments, the audio fingerprinting module 304 preprocesses the audio signal, transforms the audio signal from one domain (e.g., time domain) to another domain (e.g., frequency domain), filters the transformed audio signal, and generates the audio fingerprint from the filtered audio signal. In some embodiments, the audio fingerprint is generated using a Discrete Cosine Transform (DCT). In some embodiments, a match between a first audio fingerprint and a second audio fingerprint may be determined when a Hamming distance between the set of bits corresponding to the first audio fingerprint and the set of bits corresponding to the second audio fingerprint satisfies a threshold value. More details describing such audio fingerprint generation and matching are described in U.S. patent application Ser. Nos. 14/153,404 and 14/552,039, both of which are incorporated by reference herein. Audio fingerprints that are generated for content items can be stored and used for identifying matching content. In some instances, a portion of a content item may include silence, i.e., no perceptible audio. For example, a determination may be made that a portion of a content item is audibly silent based on an audio waveform corresponding to the content item. In some embodiments, audio fingerprints generated for portions containing silent content can be flagged, for example, by changing the bit strings of those audio fingerprints to all zeros. In such embodiments, portions of the content item that have been marked as silent can be skipped when performing fingerprint matching.

In some embodiments, each audio fingerprint corresponds to a pre-defined frame rate (e.g., 8 frames per second, 16 frames per second, 32 frames per second, etc.). For example, at 16 frames per second, an audio fingerprint of a content item can correspond to a series of frames (e.g., 16 audio frames) and can represent one second of audio in the content item. In this example, each of the 16 frames corresponding to the audio fingerprint may be represented as a set of 64 bits or a 64 bit integer. In some embodiments, audio fingerprints, video fingerprints, and thumbnail fingerprints are generated by the fingerprinting module 302 at the same pre-defined frame rate. More details describing the storage and retrieval of audio fingerprints will be provided below with reference to FIG. 4.

The video fingerprinting module 306 can be configured to obtain, or generate, video fingerprints for content items. In some embodiments, when computing a video fingerprint, the video fingerprinting module 306 converts data describing a set of video frames (e.g., 8 frames, 16 frames, 32 frames, etc.) of the content item from a time domain to a frequency domain. For example, the set of frames may be a set of consecutive frames (e.g., Frame 1 to Frame 8, Frame 1 to Frame 16, etc.) in the content item. In such embodiments, the video fingerprinting module 306 determines respective feature values for the set of frames to be used for converting the frames into frequency domain. A feature value for a frame can be determined based on one or more features corresponding to the frame. In one example, a feature value for a frame can be determined by calculating a brightness of the frame, for example, by averaging the values of pixels in the frame. In another example, a feature value for a frame can be determined based on coloration components in the frame, for example, based on the RGB color model and/or the YUV color space. Each feature value for the set of frames can be included in an array or buffer. These feature values can then be converted to a frequency domain. In some embodiments, the feature values are converted to a frequency domain by applying a Fast Fourier Transform (FFT), a Discrete Cosine Transform (DCT), or both. Once converted, the values for the set of frames over time are represented as a distribution of frequency components.

In some embodiments, each video fingerprint corresponds to a pre-defined frame rate (e.g., 8 frames per second, 16 frames per second, 32 frames per second, etc.). For example, at 16 frames per second, a video fingerprint of a content item can correspond to a series of 16 frames and can represent one second of video in the content item. In this example, each of the 16 frames corresponding to the video fingerprint may be represented as a set of 64 bits or a 64 bit integer. In various embodiments, the video fingerprinting module 306 can perform generally known interpolation techniques so that the video fingerprint corresponds to the pre-defined frame rate despite the content item being fingerprinted having a different frame rate. Such interpolation can be performed in the frequency domain using the spectral components that were determined for the set of frames. For example, the interpolation of two frames may be done by discarding any high frequency coefficients that exceed a threshold (e.g., low-pass filter) while keeping the remaining low frequency coefficients.

The video fingerprinting module 306 can quantize these low frequency coefficients to generate a set of bits that correspond to a frame included in the video fingerprint. As mentioned, in some embodiments, the video fingerprint corresponds to a sequence of frames and each frame is represented as a set of 64 bits or a 64 bit integer. In some embodiments, if applying an 8-point FFT to the set of frames, the video fingerprinting module 306 can quantize four of the low frequency components to generate the respective 64 bits that represent each frame in the set of frames. To compute the next video fingerprint, the video fingerprinting module 306 can shift the set of frames by one by discarding the value for the first frame in the set and appending a corresponding value for the next frame of the content item. Thus, for example, if the initial set of frames included values for frames 1 to 8, then the shifted set of frames will include values for frames 2 to 9. The video fingerprinting module 306 can then generate another video fingerprint using the shifted set of frames as described above. In various embodiments, the video fingerprinting module 306 continues shifting the set of frames to generate video fingerprints until the last frame in the content item (e.g., end of the live content stream or end of the on-demand content item file) is reached. Thus, in such embodiments, fingerprints correspond to overlapping frames of the content item being fingerprinted. For example, a first fingerprint can be determined from frames 1 to 16, a second fingerprint can be determined from frames 2 to 17, a third fingerprint can be determined from frames 3 to 18, and so on.

Figure 6:
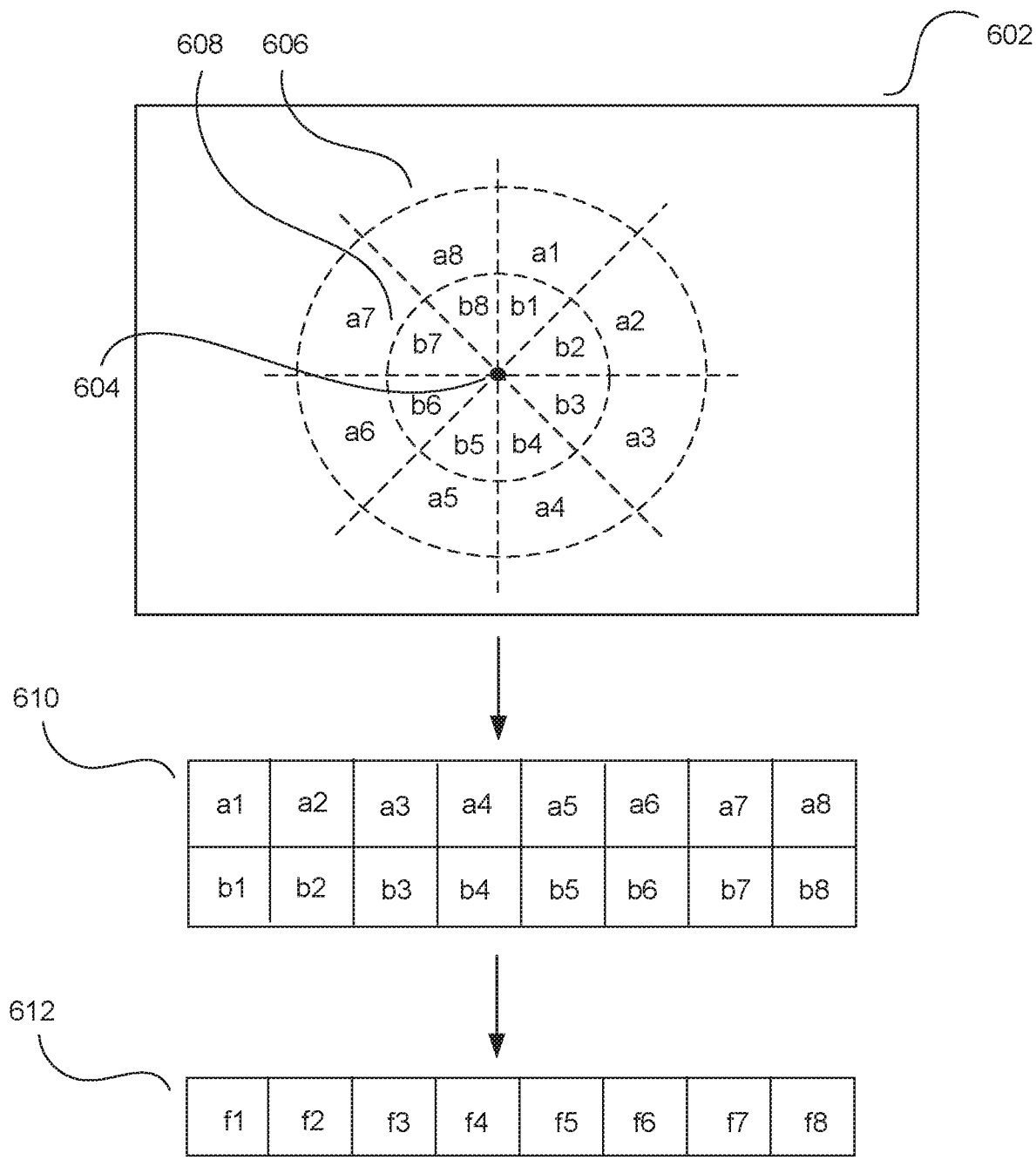
FIG. 6 illustrates an example approach for extracting feature values from a frame, according to an embodiment of the present disclosure.

In some embodiments, rather than relying on a single feature value, a vector of feature values is determined for each frame in the set of frames and these vectors are used to transform the set of video frames into the frequency domain. For example, a feature vector determined for a video frame can describe values of various features that correspond to the frame. In some embodiments, the feature values can describe changes (e.g., changes in brightness, changes in coloration, etc.) between one or more groups of pixels in the frame. In such embodiments, a first region 606 and a second region 608 within the first region 606 can be identified around a pixel 604 in a frame 602, as illustrated in the example of FIG. 6. Both the first region 606 and the second region 608 can be segmented into a set of sectors (e.g., 6, 8, 10, etc. sectors). For example, in FIG. 6, the first region 606 is divided into sectors a1, a2, a3, a4, a5, a6, a7, and a8 while the second region 608 is divided into sectors b1, b2, b3, b4, b5, b6, b7, and b8. A feature value can be computed for each sector. These feature values can be stored in a matrix 610. Next, a difference is calculated between the feature value for each inner sector (e.g., b1) and the feature value for its corresponding outer sector (e.g., a1). These differences can be stored in a matrix 612 (e.g., f1, f2, . . . , f8). In some embodiments, such differences are calculated for each pixel in the frame 602 and the respective differences are summed to produce the matrix 612. A matrix 612 can be generated for each frame in the set of video frames being processed as described above. As a result, in some embodiments, each frame in the set of video frames will be represented by a corresponding feature vector of a set of values (e.g., 8 values). The feature vectors for the set of video frames can then be interpolated, if needed, and converted to the frequency domain, for example, by applying a Discrete Cosine Transform and/or Fast Fourier Transform, as described above. In some embodiments, some or all of the feature values included in a feature vector are determined by applying generally known feature detection approaches, e.g., Oriented FAST and Rotated BRIEF (ORB).

In some embodiments, the video fingerprinting module 306 generates more than one fingerprint for each frame. For example, in some embodiments, the video fingerprinting module 306 horizontally divides a frame being fingerprinted into a top half and a bottom half. In such embodiments, a first fingerprint is generated for the top half of the frame and a second fingerprint is generated for the bottom half of the frame. For example, the first fingerprint and the second fingerprint can each be represented using 32 bits. In one example, such approaches can be used to distinguish content items that include scrolling text (e.g., end credits). Naturally, a frame may be divided in a number of different ways (e.g., vertically, diagonally, etc.) and respective fingerprints for each of the divided portions can be generated. In some embodiments, before fingerprinting content, the video fingerprinting module 306 removes all color information associated with the content and converts the content into black-and-white, or grayscale, representation. Video fingerprints that are generated for content items can be stored and used for identifying matching content. More details describing the storage and retrieval of video fingerprints will be provided below with reference to FIG. 4.

The thumbnail fingerprinting module 308 can be configured to obtain, or generate, thumbnail, or image, fingerprints for content items. In some embodiments, when generating thumbnail fingerprints for a content item, the thumbnail fingerprinting module 308 captures thumbnail snapshots of frames in the content item at pre-defined time intervals (e.g., every 1 second, every 3 seconds, etc.). Such thumbnail snapshots can be used to generate corresponding thumbnail fingerprints using generally known image fingerprinting techniques. In some embodiments, each thumbnail fingerprint is represented using a set of bits (e.g., 32 bits, 64 bits, 128 bits, etc.). In some embodiments, at each pre-defined time interval, the thumbnail fingerprinting module 308 captures multiple thumbnail snapshots at one or more scales and/or resolutions. In such embodiments, separate fingerprints can be generated for the multiple thumbnail snapshots. Such multiple fingerprints can be used to identify matching thumbnails between two content items despite there being distortions in the content being evaluated. Thumbnail fingerprints that are generated for content items can be stored and used for identifying matching content. More details describing the storage and retrieval of thumbnail fingerprints will be provided below with reference to FIG. 4.

In some embodiments, when a content item is to be fingerprinted, the fingerprinting module 302 generates audio fingerprints, video fingerprints, and/or thumbnail fingerprints for the content item. Such fingerprints can be used alone or in combination to identify other content items that include portions of content (e.g., audio, video, thumbnails) that match the fingerprinted content item. In some embodiments, an on-demand content item can be fingerprinted as soon as the file corresponding to the on-demand content item is available or uploaded, for example, to a content provider system (e.g., the social networking system). In some embodiments, a live content stream is fingerprinted as soon as data describing the live content stream is received by the content provider system.

In some embodiments, the fingerprinting module 302 is implemented on the content provider system. In such embodiments, the fingerprinting of the content item is performed by the content provider system after data describing the content item is received. In some embodiments, the fingerprinting module 302 is implemented on a user device. In such embodiments, the fingerprinting of the content item is performed by the user device as data describing the content item is sent to the content provider system. In some embodiments, the distributed fingerprinting module 310 is configured so that different types of fingerprints are generated by the user device and the content provider system. For example, in some embodiments, the distributed fingerprinting module 310 can instruct the user device to generate one or more types of fingerprints (e.g., audio fingerprints and/or thumbnail fingerprints) for a content item being provided to the content provider system. In such embodiments, the distributed fingerprinting module 310 can instruct the content provider system to generate one or more different types of fingerprints (e.g., video fingerprints) as the content item is received. Such distributed fingerprinting can allow for more optimal use of computing resources.

In some embodiments, the distributed fingerprinting module 310 can instruct the user device to generate and send one or more first types of fingerprints (e.g., audio fingerprints) for a content item being provided to the content provider system. In such embodiments, if a match between the content item and a reference content item is identified using the one or more first types of fingerprints (e.g., audio fingerprints), the distributed fingerprinting module 310 can instruct the user device to begin generating and sending one or more second types of fingerprints (e.g., video fingerprints and/or thumbnail fingerprints) for the content item being provided to further verify the matched content using the additional types of fingerprints (e.g., video fingerprints and/or thumbnail fingerprints).

Figure 4:
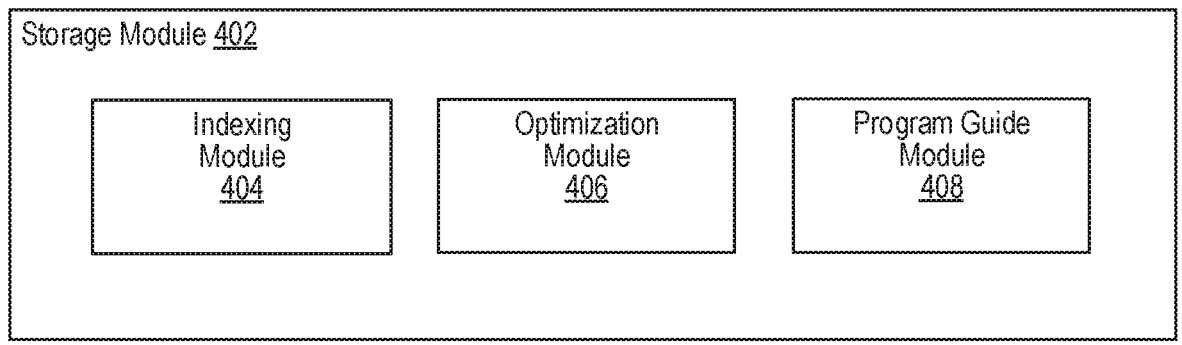
FIG. 4 illustrates an example of a storage module, according to an embodiment of the present disclosure.

FIG. 4 illustrates an example of a storage module 402, according to an embodiment of the present disclosure. In some embodiments, the storage module 206 of FIG. 2 can be implemented as the storage module 402. As shown in FIG. 4, the storage module 402 can include an indexing module 404, an optimization module 406, and a program guide module 408.

The indexing module 404 can be configured to store fingerprints (e.g., audio fingerprints, video fingerprints, thumbnail fingerprints) that are generated for content items. In general, such fingerprints may be stored using any generally known approach for storing and retrieving data. In some embodiments, fingerprints generated for live content streams are stored in a live reference database while fingerprints generated for on-demand content items are stored in a static reference database. In some embodiments, fingerprints for content items (e.g., live content streams and on-demand content items) that were provided (e.g., streamed and/or uploaded) within a threshold period of time (e.g., within the last 24 hours, 48 hours, etc.) are stored in a real-time reference database while fingerprints for content items that were provided beyond this threshold period of time are stored in a static reference database. In such embodiments, the storage module 402 moves fingerprint data for content items from the real-time reference database to the static reference database, as needed, to satisfy the separation of fingerprint data between the two databases based on the threshold period of time.

Figure 7:
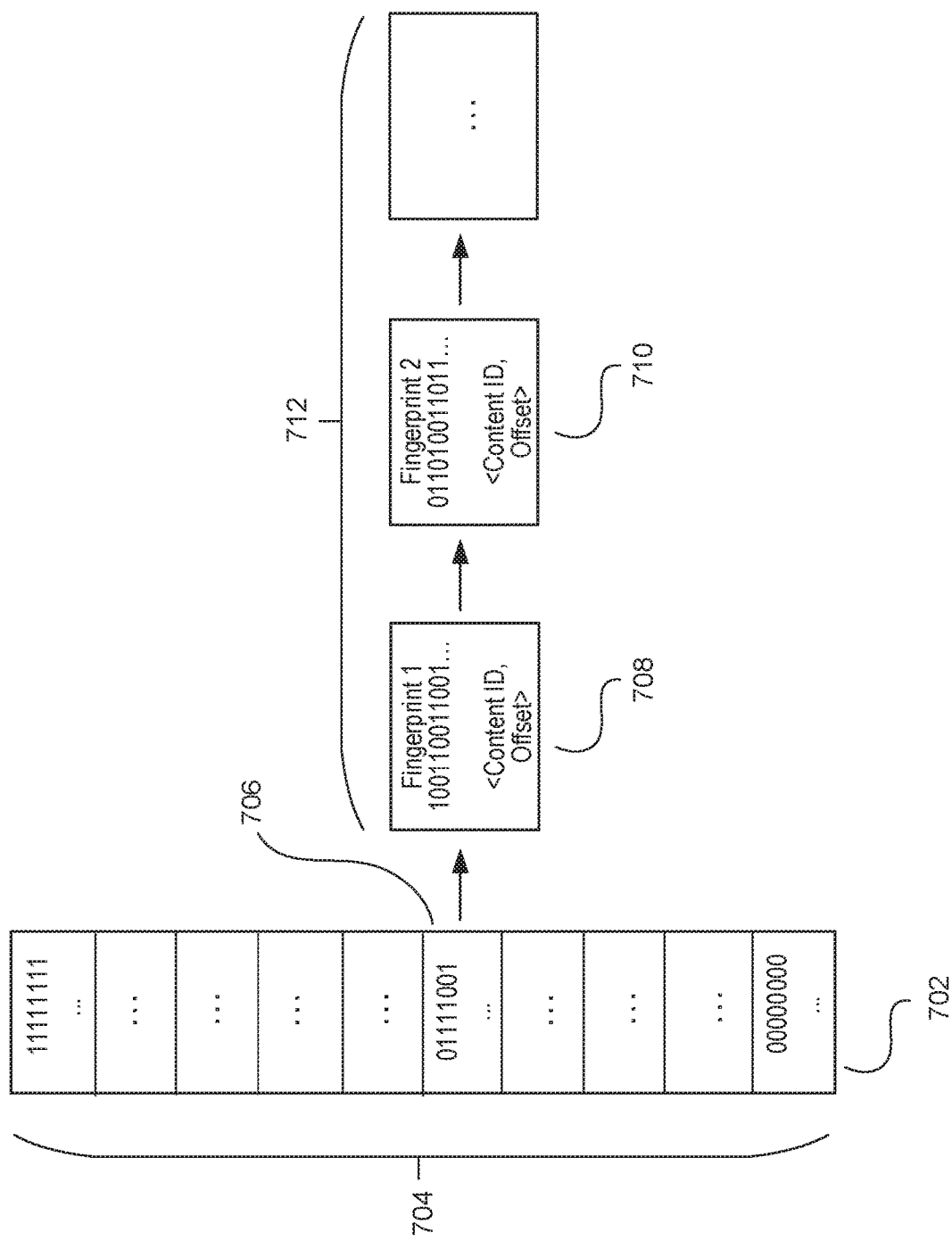
FIG. 7 illustrates an example inverted index for storing and retrieval fingerprint data, according to an embodiment of the present disclosure.

In some embodiments, the indexing module 404 stores fingerprint data in one or more inverted index data structures. For example, audio fingerprints can be stored in a first inverted index data structure, video fingerprints can be stored in a second inverted index data structure, and thumbnail fingerprints can be stored in a third inverted index data structure. As mentioned, separate inverted index data structures may be used for storing fingerprints generated for live content streams and on-demand content items. FIG. 7 illustrates an example inverted index data structure 702. In this example, the inverted index 702 includes a set of bins 704. Each bin can reference a set of fingerprinted frames that have been hashed to that bin. For example, the fingerprinted frames 708 and 710 have both been hashed to the bin 706.

As mentioned, each fingerprint can correspond to a set of frames and each frame can be represented as a set of bits, e.g., 64 bits, or an integer. In some embodiments, when inserting a fingerprinted frame into the inverted index 702, a portion of the bits corresponding to the fingerprinted frame are used to hash to one of the bins 704 in the inverted index 702. For example, the first 24 bits of the 64 bits corresponding to the fingerprinted frame 708 (e.g., the index portion) can be hashed to the bin 706. The fingerprinted frame 708 can then be added to a list 712 of fingerprinted frames that have been hashed to the bin 706. In some embodiments, when adding the fingerprinted frame 708 to the list 712, the remaining portion of the bits are stored. Thus, in this example, the residual 40 bits of the 64 bits corresponding to the fingerprinted frame 708 are stored. In some embodiments, the fingerprinted frame 708 is stored with information describing the content item from which the fingerprinted frame was generated (e.g., file identifier, stream identifier, etc.) and an offset (e.g., time stamp, frame number, etc.) that indicates the portion of the content item from which the fingerprint was generated.

In some embodiments, multiple inverted indexes can be utilized for fingerprint storage and matching. For example, a first portion of the bits corresponding to a fingerprinted frame can be hashed to one of the bins of a first inverted index. This bin in the first inverted index can reference a second inverted index. In this example, a second portion of the bits corresponding to the fingerprinted frame can be hashed to a bin in the second inverted index to identify a list of fingerprinted frames that have been hashed to that bin. The set of bits corresponding to the fingerprinted frame (the entire set of bits or the remaining portion of bits) can be added to this list in the second inverted index. For example, the first 24 bits of a 64 bit fingerprinted frame may be hashed to a bin in a first inverted index to identify a second inverted index. In this example, the next 20 bits of the 64 bit fingerprinted frame may be hashed to a bin in the second inverted index to identify a list of fingerprinted frames referenced by the bin. Here, the remaining 20 bits of the 64 bit fingerprinted frame (or all of the 64 bits) can be stored in the list. The fingerprinted frame can be stored in the second inverted index with information describing the content item from which the fingerprinted frame was generated (e.g., file identifier, stream identifier, etc.) and an offset (e.g., time stamp, frame number, etc.) that indicates the portion of the content item from which the fingerprinted frame was generated.

The optimization module 406 can be configured to manage the inverted index data structures that are utilized for fingerprint storage and matching. For example, in some embodiments, the optimization module 406 can automatically update, or clean up, the inverted indexes to remove entries that correspond to content items that have been removed from the content provider system. In some embodiments, the optimization module 406 can automatically update, or clean up, the inverted indexes to remove entries that have been stored for a threshold period of time.

In some embodiments, the inverted index 702 is utilized as a circular buffer that is configured to store fingerprint data for a pre-defined number of content items. In such embodiments, when fingerprint data for the pre-defined number of content items is being stored and a new content item is being added, the optimization module 406 can be configured to remove fingerprint data corresponding to one or more content items from the inverted index 702 to make space for the new content item. In some embodiments, the optimization module 406 removes the oldest fingerprint data corresponding to a content item that was added to the inverted index 702 (e.g., first-in, first-out). In some embodiments, the optimization module 406 removes fingerprint data corresponding to content items that have been stored in the inverted index 702 for a pre-defined time period (e.g., 24 hours, 48 hours, etc.).

In some embodiments, fingerprint data corresponding to a content item that is determined to be the least popular (or below some threshold popularity value) is removed from the inverted index 702 to make space. In one example, the popularity of a reference content item may be measured based on the number of matches between fingerprints corresponding to test content items and fingerprints that correspond to the reference content item over some period of time (e.g., over the last 24 hours, over the last 48 hours, or any specified number of minutes, hours, days, etc.). In one example, if no fingerprints of test content items have matched any fingerprints of the reference content item over the past 48 hours, then the optimization module 406 can remove all fingerprint data that corresponds to the reference content item from the inverted index 702. For example, if the fingerprinted frames 708 and 710 correspond to the reference content item, then the optimization module 406 can remove both of the fingerprinted frames 708 and 710 from the inverted index 702.

In some embodiments, the popularity of a candidate content item can be measured based on the number of times the reference content item (or any portion thereof) was accessed by users. For example, the popularity of the reference content item may be based on the number, or proportion, of users that have viewed and/or shared the content item through the content provider system over some period of time. In some embodiments, the popularity of a reference content item can be measured based on the number of content items uploaded over some period of time that matched the reference content item. For example, the popularity of the reference content item may be based on the number of content items that were uploaded to the content provider system over some period of time (e.g., the last 24 hours) and that were identified as being duplicates of, or similar to, the reference content item. In some embodiments, the popularity of a reference content item can be determined based on one or more engagement measurements. For example, the popularity of the reference content item may be based on the number of users that selected an option to like the reference content item through the content provider system over some period of time. Other types of engagement include users posting comments in response to the content item, sharing the content item, or users selecting one or more options to react to the content item, to name some examples.

In some embodiments, the optimization module 406 can reorganize the inverted index 702 so that more relevant, or popular, fingerprint data is ordered before less relevant, or less popular, fingerprint data in lists of fingerprinted frames (e.g., the list 712) that are referenced by the bins 704. As mentioned, fingerprinted frames can be hashed to the bins 704 and each bin can reference a corresponding list of fingerprinted frames that were hashed to the bin. In some embodiments, when a fingerprinted frame is hashed to a bin, data corresponding to the fingerprinted frame is appended to the end of the list. For example, if the fingerprinted frame 710 was added to the list 712 after the fingerprinted frame 708, then data corresponding to the fingerprinted frame 710 will be stored in the list 712 after the fingerprinted frame 708. As a result, when a fingerprinted frame of a test content item is being matched against fingerprinted frames hashed to the bin 706, the fingerprinted frame of the test content item will be evaluated against the fingerprinted frame 708 followed by the fingerprinted frame 710. In some embodiments, such lists can be re-ordered so that so that more relevant, or popular, fingerprint data is ordered before less relevant, or less popular, fingerprint data. Such re-ordering can help optimize the fingerprint matching process, for example, by ordering the fingerprinted frames that are more likely to match a test fingerprinted frame before other fingerprinted frames in a list. In various embodiments, the relevancy, or popularity, of a fingerprinted frame can be determined using any of the approaches described above. In one example, the popularity of a reference fingerprinted frame may be measured based on the number of times fingerprinted frames corresponding to test content items matched the reference fingerprinted frame over some period of time. In some embodiments, the optimization module 406 can obtain information that identifies which fingerprinted frames correspond to content items that are advertisements or commercials. In such embodiments, the optimization module 406 can change the ordering of a list so that such fingerprinted frames appear at the end of the list. In some embodiments, the optimization module 406 can obtain information that identifies which fingerprinted frames correspond to content that is common among content items, e.g., end credits. In such embodiments, the optimization module 406 can change the ordering of a list so that such fingerprinted frames appear at the end of the list.

In some embodiments, the program guide module 408 can store program guide information (e.g., program scheduling information) for various channels, e.g., live content streams. The program guide information for a given channel may be provided by a content provider, or publisher, that streams content through the channel. Such program guide information can include, for example, a start time and an end time for various content (e.g., content items, commercials, etc.) being broadcasted through the channel. For example, the program guide information can indicate that a first show will air from 10 am to 10:30 am and that advertisements will be presented between 10:08-10:11 am, 10:18-10:21 am, and 10:26-10:28 am. In general, content provided through live content streams can be identified using such program guide information. In some embodiments, the program guide module 408 can determine which portions of such content are of interest to users. For example, the program guide module 408 can obtain measurement information that indicates the number of times various portions of a given content item were accessed (e.g., viewed, shared, jumped, fast forwarded, or skipped to, etc.) by users. Such measurement information can be obtained for each fingerprinted frame of a content item or chunks of a content item of some specified length (e.g., chunks having a length of 2 seconds), for example. Based on such measurement information, the program guide module 408 can identify the popular portions of various content items. For example, a portion of a content item that has been accessed by a threshold number of users and/or a threshold number of times can be identified as a popular portion. In some embodiments, the program guide module 408 can provide bookmarks, or indicators, for the identified portions so that users can easily jump to the desired portion.

Figure 5:
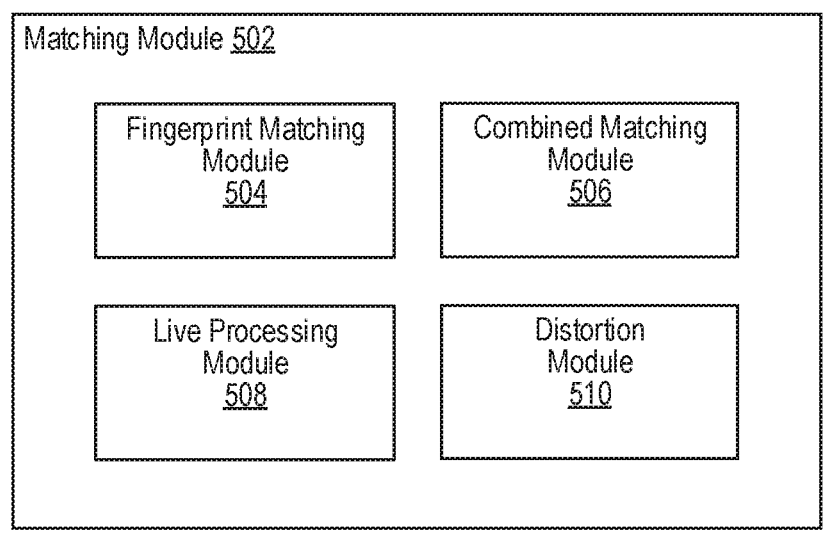
FIG. 5 illustrates an example of a matching module, according to an embodiment of the present disclosure.

FIG. 5 illustrates an example of a matching module 502, according to an embodiment of the present disclosure. In some embodiments, the matching module 208 of FIG. 2 can be implemented as the matching module 502. As shown in FIG. 5, the matching module 502 can include a fingerprint matching module 504, a combined matching module 506, a live processing module 508, and a distortion module 510.

The fingerprint matching module 504 can be configured to identify any portions of content in a first (or test) content item that matches portions of content in one or more second (or reference) content items. In various embodiments, the fingerprint matching module 504 can evaluate the test content item using a set of fingerprints (e.g., audio fingerprints, video fingerprints, thumbnail fingerprints) corresponding to the test content item and these fingerprints can be used to identify one or more reference content items to be analyzed. Such reference content items may have been identified, or designated, as being protected (or copyrighted). In general, test content items that include any content that matches content in a reference content item can be flagged and various actions can be taken. Reference content items can be identified, for example, using an inverted index data structure, as described above.

Figure 8A:
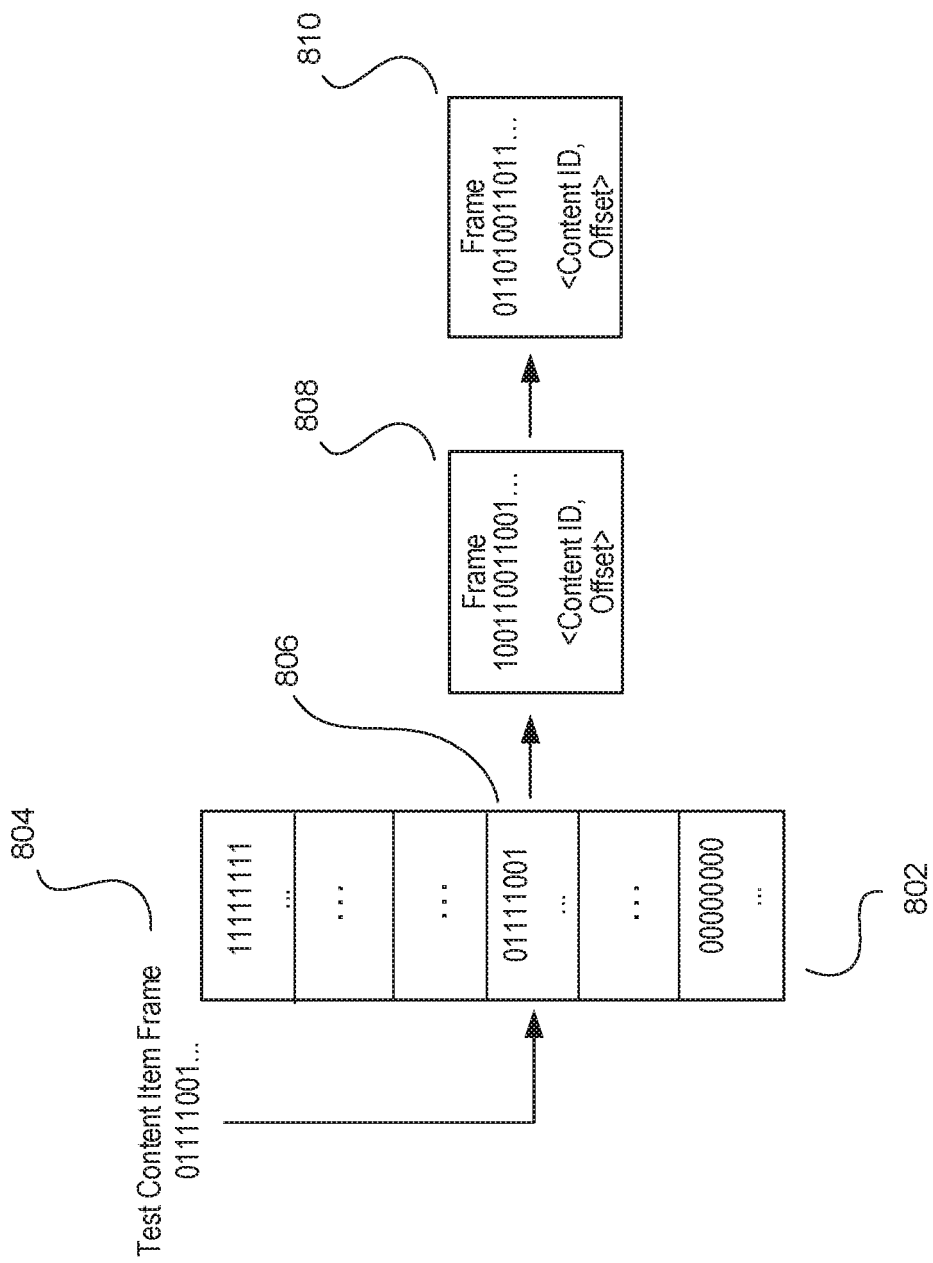
FIGS. 8A-B illustrate an example approach for identifying matching content between content items, according to an embodiment of the present disclosure.

For example, as illustrated in FIG. 8A, the fingerprint matching module 504 can obtain a video fingerprint that was generated from the test content item. The video fingerprint can correspond to a set of frames (e.g., 16 frames) and each frame can be represented as a set of bits (e.g., 64 bits). In some embodiments, a first portion of a frame 804 in the fingerprint (e.g., the first 24 bits) can be used to hash to a bin 806 in an inverted index 802 and a second portion of the frame 804 (e.g., the remaining 40 bits) can be used to verify matches between frames. As mentioned, the inverted index 802 includes a set of bins and each bin can reference a set of fingerprinted frames that have been hashed to that bin. For example, in FIG. 8A, the bin 806 references a fingerprinted frame 808 and a fingerprinted frame 810. In this example, both the fingerprinted frame 808 and the fingerprinted frame 810 are candidates matches. The fingerprint matching module 504 can evaluate each of the fingerprinted frames 808, 810 that correspond to the bin 806 to determine whether the fingerprinted frames match the frame 804. In some embodiments, the fingerprint matching module 504 determines a Hamming distance between a set of bits corresponding to a first frame and a set of bits corresponding to a second frame. In such embodiments, the fingerprint matching module 504 determines a match between the first frame and the second frame when the Hamming distance satisfies a threshold value. Thus, for example, the fingerprint matching module 504 can determine a Hamming distance between the set of bits corresponding to the frame 804 and the set of bits corresponding to the fingerprinted frame 808. If this Hamming distance satisfies a threshold value, then a match between the frame 804 and the fingerprinted frame 808 is identified. The same process can be applied to the remaining fingerprinted frames (e.g., the fingerprinted frame 810) that are referenced by the bin 806 to which the frame 804 was hashed to identify any other matches.

When a match between the frame 804 of the test content item and a fingerprinted frame (e.g., the fingerprinted frame 808) of the reference content item has been identified, the fingerprint matching module 504 can evaluate the reference content item from which the matching fingerprinted frame 808 was generated to determine the extent, or boundary, of the matching content between the test content item and the reference content item. As mentioned, each frame stored in the inverted index 802 can also indicate the reference content item from which the fingerprinted frame was generated (e.g., a file name, stream identifier, etc.) and an offset that indicates the portion of the reference content item to which the fingerprinted frame corresponds. Using such information, the fingerprint matching module 504 can access a set of fingerprinted frames 840 that were chronologically generated for the entirety of the reference content item, as illustrated in the example FIG. 8B. The fingerprint matching module 504 can also access a set of fingerprinted frames 860 that correspond to the test content item. In some embodiments, the fingerprint matching module 504 processes the test content item and the reference content item in chunks (e.g., one second chunks). Thus, for example, if each fingerprint corresponds to 16 frames per second, then the fingerprint matching module 504 processes 16 frames of content per second.

Figure 8B:
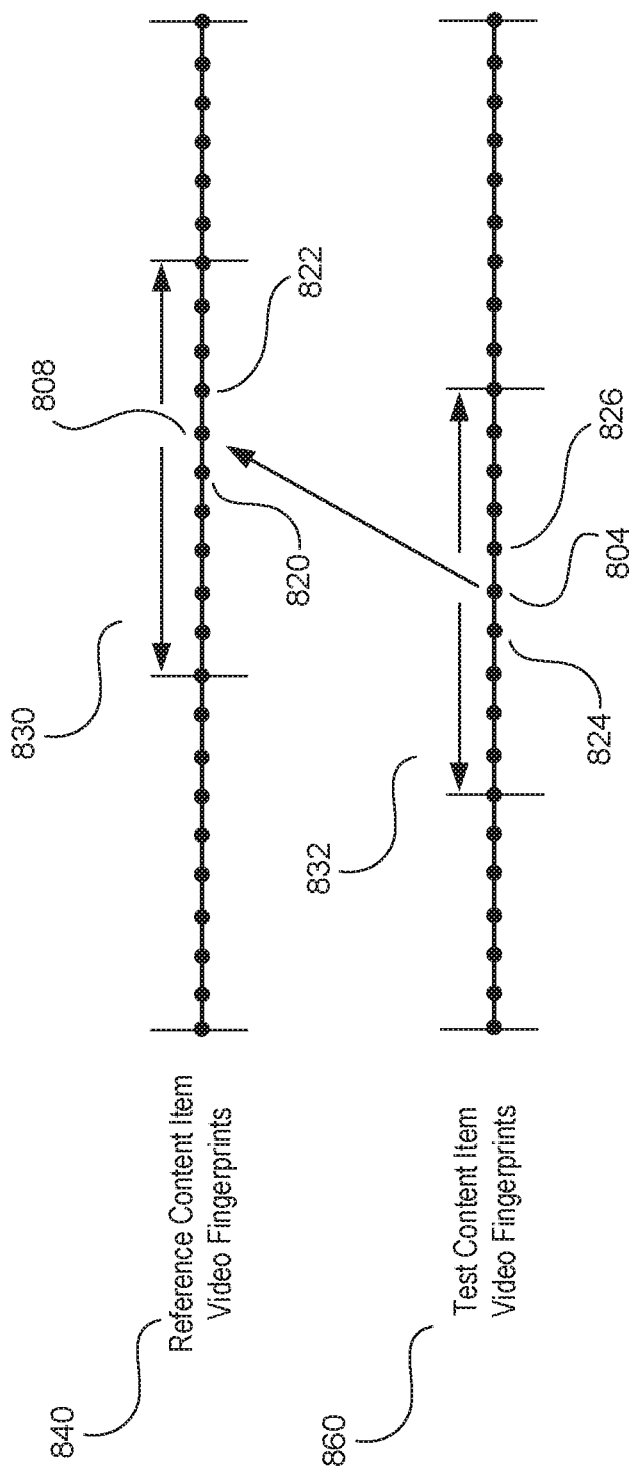

As shown in FIG. 8B, the fingerprint matching module 504 can evaluate each fingerprinted frame that precedes the matching fingerprinted frame 808 of the reference content item against each corresponding fingerprinted frame that precedes the fingerprinted frame 804 of the test content item. Thus, for example, the fingerprint matching module 504 can compute a Hamming distance between the fingerprinted frame 820 of the reference content item and the fingerprinted frame 824 of the test content item. If the Hamming distance satisfies a threshold value, then a content match is found. The fingerprint matching module 504 can continue such matching with each preceding frame until no match is found or until the beginning of the reference content item and/or the test content item is reached. Similarly, the fingerprint matching module 504 can evaluate each fingerprinted frame subsequent to the matching fingerprint 808 in the reference content item against each corresponding fingerprinted frame that is subsequent to the matching fingerprinted frame 804 in the test content item. Thus, for example, the fingerprint matching module 504 can compute a Hamming distance between the fingerprinted frame 822 of the reference content item and the fingerprinted frame 826 of the test content item. If the Hamming distance satisfies a threshold value, then a content match is found. The fingerprint matching module 504 can continue such matching with each subsequent frame until no match is found or until the end of the reference content item and/or the test content item is reached. Once such matching is complete, the fingerprint matching module 504 can identify which portion 832 of the test content item matches a boundary 830 of the reference content item. This matching process can be applied to find matches between audio fingerprints of a test content item and a reference content item, video fingerprints of a test content item and a reference content item, and/or thumbnail fingerprints of a test content item and a reference content item.

In some embodiments, information describing the matching portions 830 and 832 is provided to various personnel for further review. In some embodiments, if the matching portions 830 and 832 satisfy a threshold length of time (e.g., 30 seconds), then the fingerprint matching module 504 can automatically flag the test content item for further review. In some embodiments, if the matching portions 830 and 832 satisfy a threshold length of time (e.g., 30 seconds), then the fingerprint matching module 504 can automatically prevent users from accessing the test content item. In some embodiments, the fingerprint matching module 504 may determine that the test content item and the reference content item are duplicates (i.e., all of the test content item matches all of the reference content item). In such embodiments, the test content item may automatically be deleted.

The combined matching module 506 can be configured to utilize multiple types of fingerprints (e.g., audio, video, thumbnail) to identify matching content between a test content item and a reference content item. For example, in some embodiments, the combined matching module 506 can determine matching content between a test content item and a reference content item using audio fingerprints, as described above. In such embodiments, the combined matching module 506 supplements the matching using other types of fingerprints (e.g., video fingerprints and/or thumbnail fingerprints) when no matches are found using the audio fingerprints for a threshold period of time and/or a threshold number of frames. In some embodiments, the combined matching module 506 can verify content matches that were determined using audio fingerprints by additional use of corresponding video fingerprints (or thumbnail fingerprints). Such verification can be useful, for example, to distinguish between a video ad that includes copyrighted music over a music video. Similarly, in some embodiments, the combined matching module 506 can verify content matches that were determined using video fingerprints by additional use of corresponding audio fingerprints (or thumbnail fingerprints). In various embodiments, audio fingerprints and video fingerprints are generated at a pre-defined frame rate. As a result, the combined matching module 506 can easily cross-reference between an audio fingerprint and a video fingerprint for a given frame.

In some embodiments, a user device that is providing a content item to the content provider system can be instructed to generate and send thumbnail fingerprints of the content item. In such embodiments, the combined matching module 506 can utilize the thumbnail fingerprints to identify matching content between the content item and a reference content item. If a match is found, the user device can be instructed to generate and send other types of fingerprints of the content item (e.g., audio fingerprints and/or video fingerprints). The combined matching module 506 can utilize the other types of fingerprints to verify the frame matches that were determined using the thumbnail fingerprints. For example, if a match is determined between a frame of the content item and a frame of a reference content item using thumbnail fingerprints, then the combined fingerprint matching module 506 can confirm the match using video fingerprints that correspond to the matching frames of the content item and the reference content item. In some embodiments, if a match is found using the thumbnail fingerprints, the content provider system can begin generating other types of fingerprints (e.g., audio fingerprints and/or video fingerprints) for the content item for verification purposes.

Figure 9A:
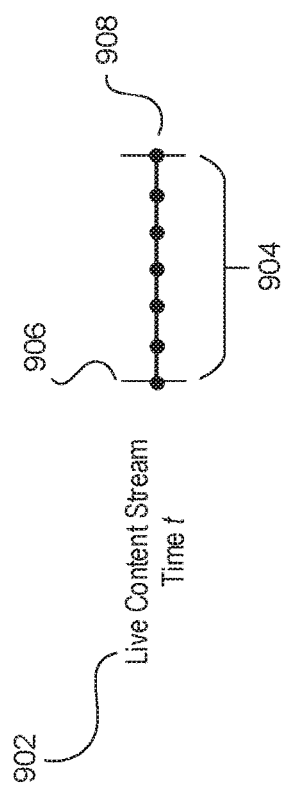
FIGS. 9A-C illustrate an example approach for processing a live content stream, according to an embodiment of the present disclosure.
Figure 9B:
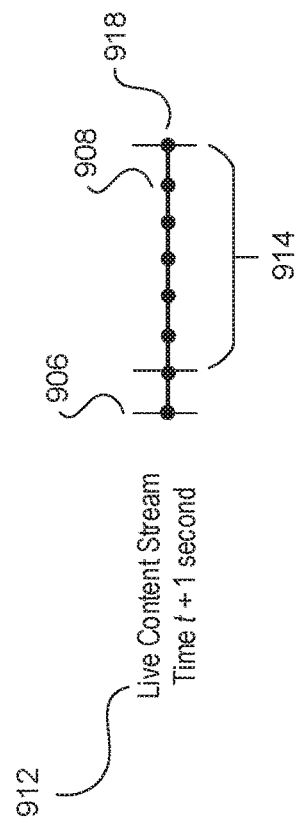
Figure 9C:
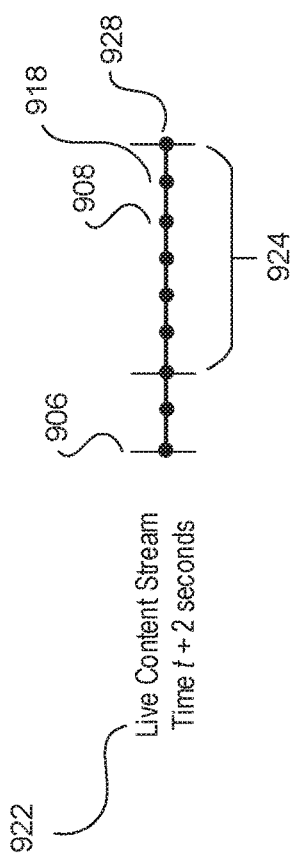

Generally, when evaluating content of an on-demand content item, the matching module 502 is able to identify one or more reference content items and evaluate these reference content items against the on-demand content item to identify matching content. In some embodiments, the matching module 502 can be configured to process live content streams differently for purposes of content matching. For example, in some embodiments, the live processing module 508 can be configured to process a live content stream being received in fixed portions using a sliding window. In some embodiments, the live processing module 508 can define the sliding window to include frames of the live content stream that correspond to a fixed length of time (e.g., the last 20 seconds of content) or a fixed number of frames (e.g., 16 frames). FIG. 9A illustrates an example diagram of a live content stream 902 being received by the content provider system from a user device. In the example of FIG. 9A, a sliding window 904 corresponds to 20 seconds of the live content stream 902 as defined by a frame 906 and a frame 908. In some embodiments, when a live content stream is being received, the live processing module 508 buffers the live content stream until the length of the sliding window 904 is satisfied. For example, if the sliding window corresponds to a length of 20 seconds, then the live processing module 508 buffers 20 seconds of the live content stream. Once buffered, the live processing module 508 fingerprints a portion of the content in the sliding window 904 (e.g., the last one second of the content in the sliding window 904), as described above. Once fingerprinted, the live processing module 508 can determine whether the fingerprinted portion of the live content stream matches any reference content items. As described above, the matching process will attempt to determine a boundary of the matching content by evaluating the previously received frames in the live content stream 902. In this example, when another one second of the live content stream is received, the sliding window advances to encompass the most recent 20 seconds of the live content stream. FIG. 9B illustrates an example diagram of the live content stream 912 after another one second of the live content stream is received. In the example of FIG. 9B, the sliding window 914 has advanced to the most recent 20 seconds of the live content stream and is now bounded by frames 906 and 918. Similarly, in this example, the live processing module 508 fingerprints the last one second of the live content stream that was received and determines whether the fingerprinted portion matches any reference content items. FIG. 9C illustrates an example diagram of the live content stream 922 after another one second of the live content stream is received. In the example of FIG. 9C, the sliding window 924 has advanced to the most recent 20 seconds of the live content stream and is now bounded by frames 906 and 928. Similarly, in this example, the live processing module 508 fingerprints the last one second of the live content stream that was received and determines whether the fingerprinted portion matches any reference content items. This approach of processing a live content stream using a sliding window allows for optimally detecting matching content in reference content items. This approach can also address situations in which receipt of a reference live content stream is delayed. In such instances, the content provider system is able to determine matching content between a test live content stream and the delayed reference live content stream. In some embodiments, the sliding window can be extended to facilitate identification of content that includes repeating patterns.

In some instances, a live content stream may be susceptible to distortions which can complicate the matching process. For example, a user may provide a live content stream of a concert that was captured using a computing device. This live content stream may be captured from a certain angle and/or zoom level. The captured content may also be susceptible to various rotations that result from shaking of the computing device. Such distortions may make it difficult to find an exact match against a reference live content stream (i.e., a protected, or copyrighted, stream) that was provided by an authorized broadcaster, for example. In some embodiments, the distortion module 510 is configured to apply various approaches to facilitate content matching despite such distortions.

For example, in some embodiments, when attempting to find matches for a fingerprinted frame of a live content stream, the distortion module 510 can generate a set of distorted fingerprinted frames and attempt to find matches using each of the distorted fingerprinted frames. Thus, in the example above, when attempting to find matches for a fingerprinted frame that corresponds to the last one second of a live content stream, the distortion module 510 permutes the index portion of the set of bits corresponding to the fingerprinted frame (e.g., the first 24 bits). In some embodiments, this index portion is used to find reference content items in one or more inverted indexes, as described above. In some embodiments, the distortion module 510 permutes the index portion of the fingerprinted frame one bit at a time. For example, assume that the frame is represented using six bits "010111" and the index portion is represented using the first three bits, e.g., "010". In this example, the distortion module 510 can permute the index portion one bit at a time to generate the following set of distortions: "000", "011", "110". These distortions can be prepended to the remaining three bits corresponding to the frame, e.g., "111" to produce the following set of distorted fingerprinted frames: "000111", "001111", "011111", "100111", "101111", "110111", and "111111". Each of these distorted fingerprinted frames can be used to identify one or more reference content items and determine what portions of those reference content items include matching content, as described above. In some embodiments, the distortion module 510 permutes the index portion of the fingerprinted frame multiple bits (e.g., two bits) at a time to generate additional distorted fingerprints frames to identify matching content. In example above, the distortion module 510 can permute the index portion "010" two bits at a time to generate the following set of distortions: "001", "111", and "100". In some embodiments, rather than only distorting the index portion, the distortion module 510 permutes all of the bits corresponding to a fingerprinted frame.

Such permutations generally increase the amount of content to be evaluated when determining matching portions of two content items thereby accounting for distortions that may exist in the test content item being analyzed. However, in some instances, various approaches to regulate the amount of content to be evaluated may be applied for purposes of improving system performance. For example, in some embodiments, distortions may be generated and tested in stages until a threshold central processing unit (CPU) usage is reached (e.g., 70 percent, 75 percent, etc.). For example, a fingerprinted frame may first be evaluated without any distortions. If no matches are found, then the fingerprinted frame may be distorted by permuting one bit at a time. If no matches are found using the permutations, then the fingerprinted frame may be distorted by permuting two bits at a time. In some embodiments, distortions may be generated and tested in stages until a threshold query time (e.g., 150 milliseconds, 200 milliseconds, etc.) is reached. In such embodiments, the matching process is discontinued when the threshold query time is reached. As mentioned, a fingerprint can correspond to a series of frames (e.g., 16 frames) over some length of content (e.g., one second of content). In some embodiments, instead of evaluating each of the 16 fingerprinted frames corresponding to the fingerprint, the distortion module 510 can be configured to skip the evaluation of one or more of fingerprinted frames (e.g., skip 15 frames and evaluate only the 16$^{th}$ frame corresponding to the fingerprint). In some embodiments, when evaluating a fingerprint, the matching module 502 can be configured to segment the fingerprint into a set of smaller chunks and each of the chunks in the set can be processed in parallel using generally known parallel processing techniques.

Figure 10:
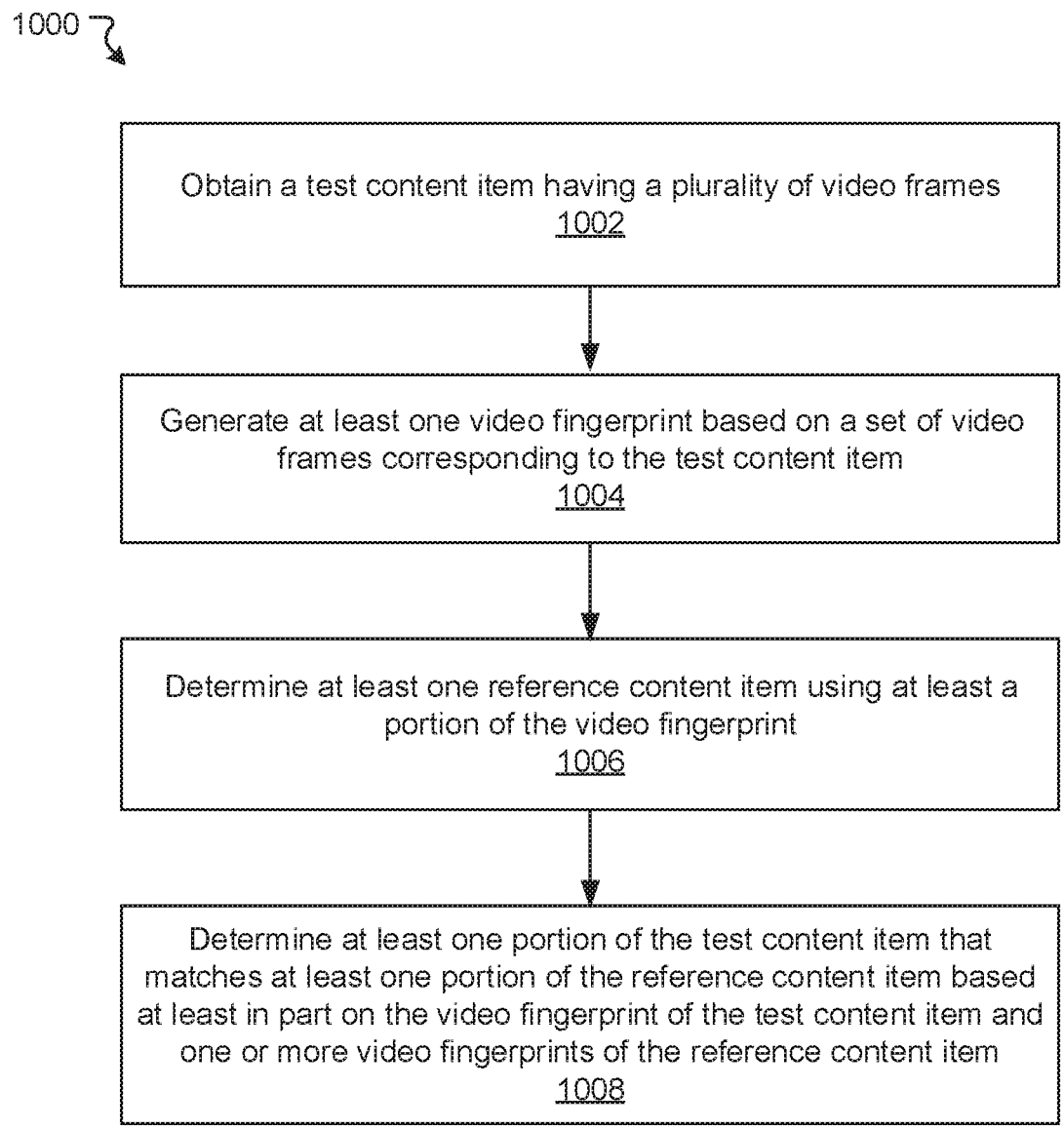
FIG. 10 illustrates an example process for fingerprinting content, according to various embodiments of the present disclosure.

FIG. 10 illustrates an example process 1000 for fingerprinting content, according to various embodiments of the present disclosure. It should be appreciated that there can be additional, fewer, or alternative steps performed in similar or alternative orders, or in parallel, within the scope of the various embodiments discussed herein unless otherwise stated.

At block 1002, a test content item having a plurality of video frames is obtained. At block 1004, at least one video fingerprint is generated based on a set of video frames corresponding to the test content item. At block 1006, at least one reference content item is determined using at least a portion of the video fingerprint. At block 1008, a determination is made that at least one portion of the test content item matches at least one portion of the reference content item based at least in part on the video fingerprint of the test content item and one or more video fingerprints of the reference content item.

FIG. 11 illustrates an example process 1100 for matching content using different types of fingerprints, according to various embodiments of the present disclosure. It should be appreciated that there can be additional, fewer, or alternative steps performed in similar or alternative orders, or in parallel, within the scope of the various embodiments discussed herein unless otherwise stated.

At block 1102, at least one portion of a test content item is evaluated with at least one portion of a reference content item using one or more first fingerprints of the test content item and one or more first fingerprints of the reference content item. The first fingerprints correspond to a first type of media. At block 1104, a determination is made that at least one verification criteria is satisfied. At block 1106, the portion of the test content is evaluated with the portion of the reference content using one or more second fingerprints of the test content item and one or more second fingerprints of the reference content item. The second fingerprints correspond to a second type of media that is different from the first type of media.

Figure 12:
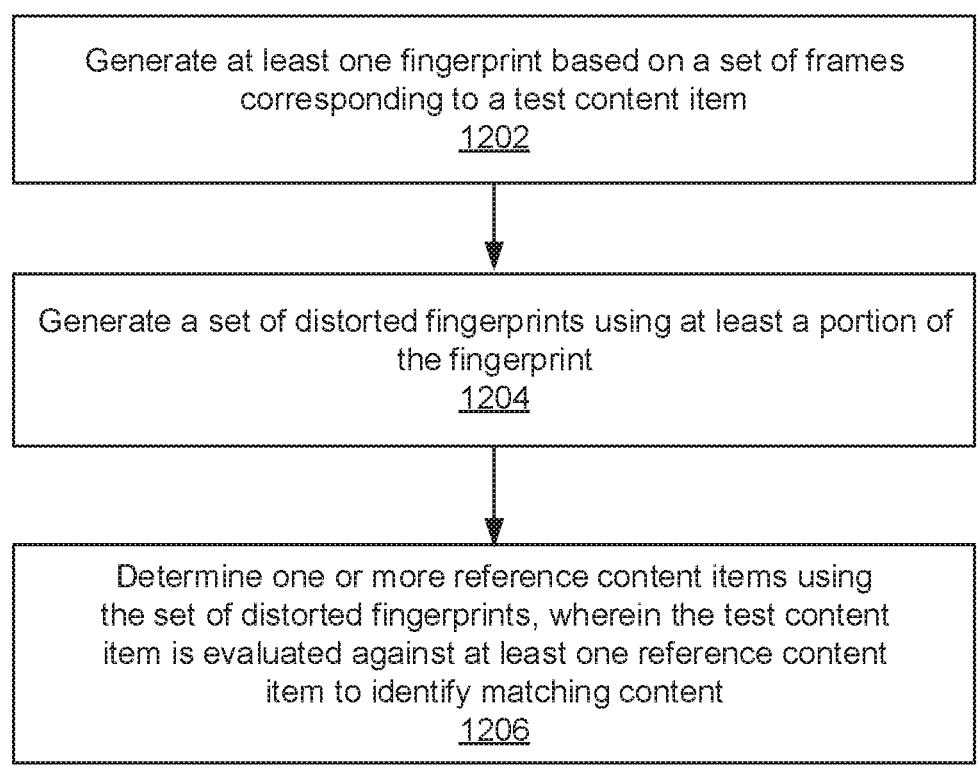
FIG. 12 illustrates an example process for matching content using distorted fingerprints, according to various embodiments of the present disclosure.

FIG. 12 illustrates an example process 1200 for matching content using distorted fingerprints, according to various embodiments of the present disclosure. It should be appreciated that there can be additional, fewer, or alternative steps performed in similar or alternative orders, or in parallel, within the scope of the various embodiments discussed herein unless otherwise stated.

At block 1202, at least one fingerprint is generated based on a set of frames corresponding to a test content item. At block 1204, a set of distorted fingerprints are generated using at least a portion of the fingerprint. At block 1206, one or more reference content items are determined using the set of distorted fingerprints, wherein the test content item is evaluated against at least one reference content item to identify matching content.

Figure 13:
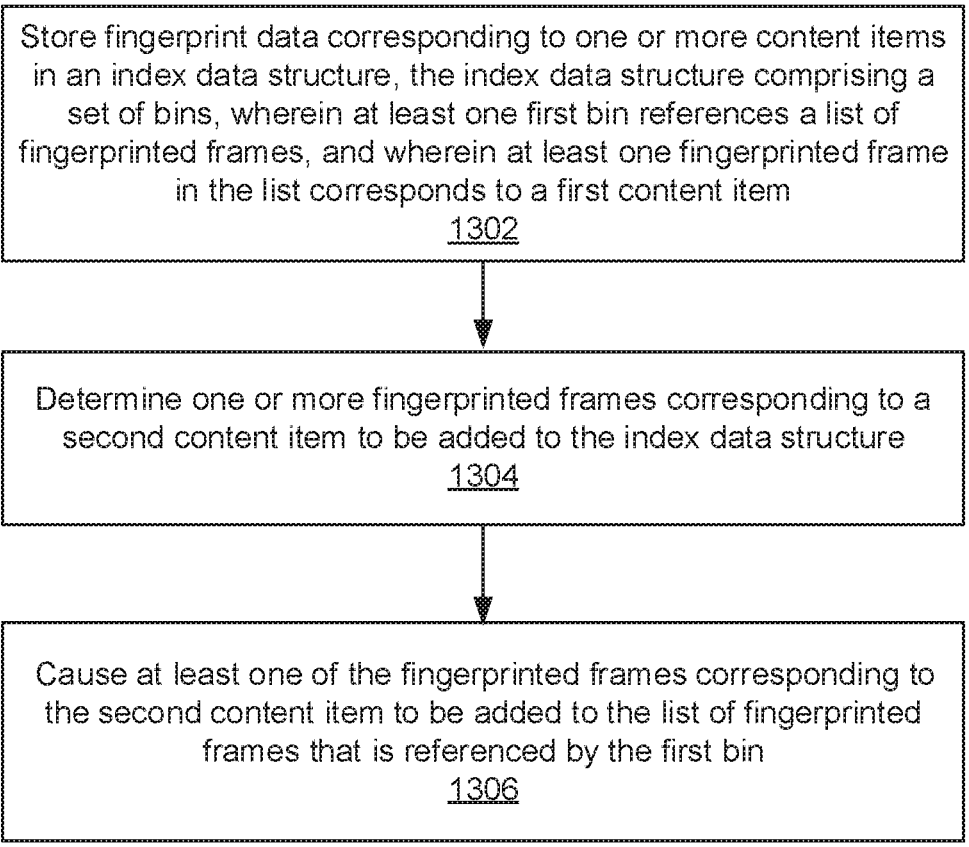
FIG. 13 illustrates an example process for storing content, according to various embodiments of the present disclosure.

FIG. 13 illustrates an example process 1300 for storing content, according to various embodiments of the present disclosure. It should be appreciated that there can be additional, fewer, or alternative steps performed in similar or alternative orders, or in parallel, within the scope of the various embodiments discussed herein unless otherwise stated.

At block 1302, fingerprint data corresponding to one or more content items is stored in an index data structure, the index data structure comprising a set of bins, wherein at least one first bin references a list of fingerprinted frames, and wherein at least one fingerprinted frame in the list corresponds to a first content item. At block 1304, a determination is made that one or more fingerprinted frames corresponding to a second content item are to be added to the index data structure. At block 1306, at least one of the fingerprinted frames corresponding to the second content item are added to the list of fingerprinted frames that is referenced by the first bin.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 14:
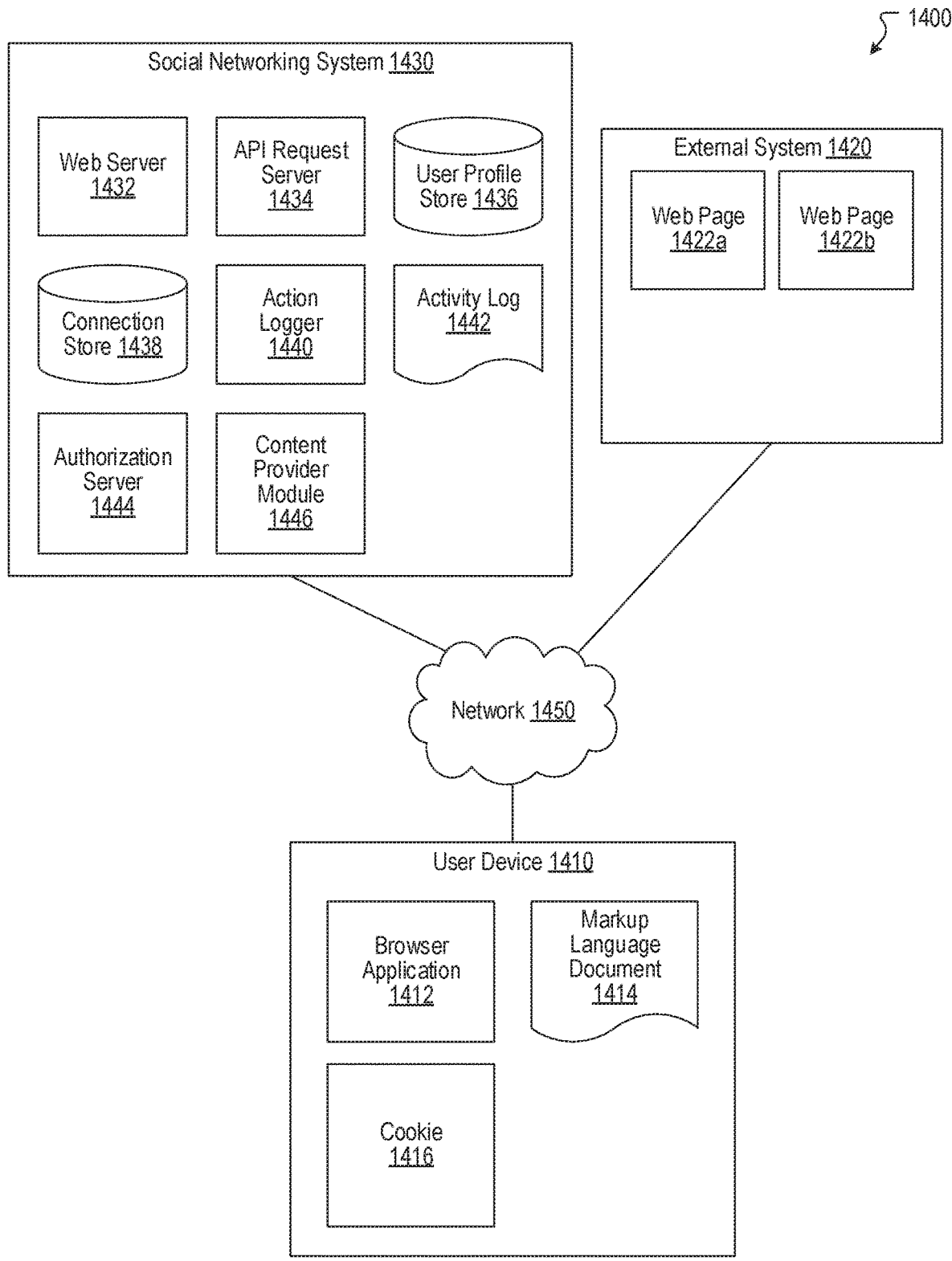
FIG. 14 illustrates a network diagram of an example system including an example social networking system that can be utilized in various scenarios, according to an embodiment of the present disclosure.

FIG. 14 illustrates a network diagram of an example system 1400 that can be utilized in various scenarios, in accordance with an embodiment of the present disclosure. The system 1400 includes one or more user devices 1410, one or more external systems 1420, a social networking system (or service) 1430, and a network 1450. In an embodiment, the social networking service, provider, and/or system discussed in connection with the embodiments described above may be implemented as the social networking system 1430. For purposes of illustration, the embodiment of the system 1400, shown by FIG. 14, includes a single external system 1420 and a single user device 1410. However, in other embodiments, the system 1400 may include more user devices 1410 and/or more external systems 1420. In certain embodiments, the social networking system 1430 is operated by a social network provider, whereas the external systems 1420 are separate from the social networking system 1430 in that they may be operated by different entities. In various embodiments, however, the social networking system 1430 and the external systems 1420 operate in conjunction to provide social networking services to users (or members) of the social networking system 1430. In this sense, the social networking system 1430 provides a platform or backbone, which other systems, such as external systems 1420, may use to provide social networking services and functionalities to users across the Internet.

The user device 1410 comprises one or more computing devices (or systems) that can receive input from a user and transmit and receive data via the network 1450. In one embodiment, the user device 1410 is a conventional computer system executing, for example, a Microsoft Windows® compatible operating system (OS), Apple OS X®, and/or a Linux distribution. In another embodiment, the user device 1410 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 1410 is configured to communicate via the network 1450. The user device 1410 can execute an application, for example, a browser application that allows a user of the user device 1410 to interact with the social networking system 1430. In another embodiment, the user device 1410 interacts with the social networking system 1430 through an application programming interface (API) provided by the native operating system of the user device 1410, such as iOS® and ANDROID®. The user device 1410 is configured to communicate with the external system 1420 and the social networking system 1430 via the network 1450, which may comprise any combination of local area and/or wide area networks, using wired and/or wireless communication systems.

In one embodiment, the network 1450 uses standard communications technologies and protocols. Thus, the network 1450 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 1450 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 1450 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 1410 may display content from the external system 1420 and/or from the social networking system 1430 by processing a markup language document 1414 received from the external system 1420 and from the social networking system 1430 using a browser application 1412. The markup language document 1414 identifies content and one or more instructions describing formatting or presentation of the content. By executing the instructions included in the markup language document 1414, the browser application 1412 displays the identified content using the format or presentation described by the markup language document 1414. For example, the markup language document 1414 includes instructions for generating and displaying a web page having multiple frames that include text and/or image data retrieved from the external system 1420 and the social networking system 1430. In various embodiments, the markup language document 1414 comprises a data file including extensible markup language (XML) data, extensible hypertext markup language (XHTML) data, or other markup language data. Additionally, the markup language document 1414 may include JavaScript Object Notation (JSON) data, JSON with padding (JSONP), and JavaScript® data to facilitate data-interchange between the external system 1420 and the user device 1410. The browser application 1412 on the user device 1410 may use a JavaScript® compiler to decode the markup language document 1414.

The markup language document 1414 may also include, or link to, applications or application frameworks such as FLASH™ or Unity™ applications, the Silverlight™ application framework, etc.

In one embodiment, the user device 1410 also includes one or more cookies 1416 including data indicating whether a user of the user device 1410 is logged into the social networking system 1430, which may enable modification of the data communicated from the social networking system 1430 to the user device 1410.

The external system 1420 includes one or more web servers that include one or more web pages 1422a, 1422b, which are communicated to the user device 1410 using the network 1450. The external system 1420 is separate from the social networking system 1430. For example, the external system 1420 is associated with a first domain, while the social networking system 1430 is associated with a separate social networking domain. Web pages 1422a, 1422b, included in the external system 1420, comprise markup language documents 1414 identifying content and including instructions specifying formatting or presentation of the identified content. As discussed previously, it should be appreciated that there can be many variations or other possibilities.

The social networking system 1430 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 1430 may be administered, managed, or controlled by an operator. The operator of the social networking system 1430 may be a human being, an automated application, or a series of applications for managing content, regulating policies, and collecting usage metrics within the social networking system 1430. Any type of operator may be used.

Users may join the social networking system 1430 and then add connections to any number of other users of the social networking system 1430 to whom they desire to be connected. As used herein, the term "friend" refers to any other user of the social networking system 1430 to whom a user has formed a connection, association, or relationship via the social networking system 1430. For example, in an embodiment, if users in the social networking system 1430 are represented as nodes in the social graph, the term "friend" can refer to an edge formed between and directly connecting two user nodes.

Connections may be added explicitly by a user or may be automatically created by the social networking system 1430 based on common characteristics of the users (e.g., users who are alumni of the same educational institution). For example, a first user specifically selects a particular other user to be a friend. Connections in the social networking system 1430 are usually in both directions, but need not be, so the terms "user" and "friend" depend on the frame of reference. Connections between users of the social networking system 1430 are usually bilateral ("two-way"), or "mutual," but connections may also be unilateral, or "one-way." For example, if Bob and Joe are both users of the social networking system 1430 and connected to each other, Bob and Joe are each other's connections. If, on the other hand, Bob wishes to connect to Joe to view data communicated to the social networking system 1430 by Joe, but Joe does not wish to form a mutual connection, a unilateral connection may be established. The connection between users may be a direct connection; however, some embodiments of the social networking system 1430 allow the connection to be indirect via one or more levels of connections or degrees of separation.

In addition to establishing and maintaining connections between users and allowing interactions between users, the social networking system 1430 provides users with the ability to take actions on various types of items supported by the social networking system 1430. These items may include groups or networks (i.e., social networks of people, entities, and concepts) to which users of the social networking system 1430 may belong, events or calendar entries in which a user might be interested, computer-based applications that a user may use via the social networking system 1430, transactions that allow users to buy or sell items via services provided by or through the social networking system 1430, and interactions with advertisements that a user may perform on or off the social networking system 1430. These are just a few examples of the items upon which a user may act on the social networking system 1430, and many others are possible. A user may interact with anything that is capable of being represented in the social networking system 1430 or in the external system 1420, separate from the social networking system 1430, or coupled to the social networking system 1430 via the network 1450.

The social networking system 1430 is also capable of linking a variety of entities. For example, the social networking system 1430 enables users to interact with each other as well as external systems 1420 or other entities through an API, a web service, or other communication channels. The social networking system 1430 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 1430. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 1430 modifies edges connecting the various nodes to reflect the relationships and interactions.

The social networking system 1430 also includes user-generated content, which enhances a user's interactions with the social networking system 1430. User-generated content may include anything a user can add, upload, send, or "post" to the social networking system 1430. For example, a user communicates posts to the social networking system 1430 from a user device 1410. Posts may include data such as status updates or other textual data, location information, images such as photos, videos, links, music or other similar data and/or media. Content may also be added to the social networking system 1430 by a third party. Content "items" are represented as objects in the social networking system 1430. In this way, users of the social networking system 1430 are encouraged to communicate with each other by posting text and content items of various types of media through various communication channels. Such communication increases the interaction of users with each other and increases the frequency with which users interact with the social networking system 1430.

The social networking system 1430 includes a web server 1432, an API request server 1434, a user profile store 1436, a connection store 1438, an action logger 1440, an activity log 1442, and an authorization server 1444. In an embodiment of the invention, the social networking system 1430 may include additional, fewer, or different components for various applications. Other components, such as network interfaces, security mechanisms, load balancers, failover servers, management and network operations consoles, and the like are not shown so as to not obscure the details of the system.

The user profile store 1436 maintains information about user accounts, including biographic, demographic, and other types of descriptive information, such as work experience, educational history, hobbies or preferences, location, and the like that has been declared by users or inferred by the social networking system 1430. This information is stored in the user profile store 1436 such that each user is uniquely identified. The social networking system 1430 also stores data describing one or more connections between different users in the connection store 1438. The connection information may indicate users who have similar or common work experience, group memberships, hobbies, or educational history. Additionally, the social networking system 1430 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 1430, such as non-person entities, buckets, cluster centers, images, interests, pages, external systems, concepts, and the like are also stored in the connection store 1438.

The social networking system 1430 maintains data about objects with which a user may interact. To maintain this data, the user profile store 1436 and the connection store 1438 store instances of the corresponding type of objects maintained by the social networking system 1430. Each object type has information fields that are suitable for storing information appropriate to the type of object. For example, the user profile store 1436 contains data structures with fields suitable for describing a user's account and information related to a user's account. When a new object of a particular type is created, the social networking system 1430 initializes a new data structure of the corresponding type, assigns a unique object identifier to it, and begins to add data to the object as needed. This might occur, for example, when a user becomes a user of the social networking system 1430, the social networking system 1430 generates a new instance of a user profile in the user profile store 1436, assigns a unique identifier to the user account, and begins to populate the fields of the user account with information provided by the user.

The connection store 1438 includes data structures suitable for describing a user's connections to other users, connections to external systems 1420 or connections to other entities. The connection store 1438 may also associate a connection type with a user's connections, which may be used in conjunction with the user's privacy setting to regulate access to information about the user. In an embodiment of the invention, the user profile store 1436 and the connection store 1438 may be implemented as a federated database.

Data stored in the connection store 1438, the user profile store 1436, and the activity log 1442 enables the social networking system 1430 to generate the social graph that uses nodes to identify various objects and edges connecting nodes to identify relationships between different objects. For example, if a first user establishes a connection with a second user in the social networking system 1430, user accounts of the first user and the second user from the user profile store 1436 may act as nodes in the social graph. The connection between the first user and the second user stored by the connection store 1438 is an edge between the nodes associated with the first user and the second user. Continuing this example, the second user may then send the first user a message within the social networking system 1430. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 1430 (or, alternatively, in an image maintained by another system outside of the social networking system 1430). The image may itself be represented as a node in the social networking system 1430. This tagging action may create edges between the first user and the second user as well as create an edge between each of the users and the image, which is also a node in the social graph. In yet another example, if a user confirms attending an event, the user and the event are nodes obtained from the user profile store 1436, where the attendance of the event is an edge between the nodes that may be retrieved from the activity log 1442. By generating and maintaining the social graph, the social networking system 1430 includes data describing many different types of objects and the interactions and connections among those objects, providing a rich source of socially relevant information.

The web server 1432 links the social networking system 1430 to one or more user devices 1410 and/or one or more external systems 1420 via the network 1450. The web server 1432 serves web pages, as well as other web-related content, such as Java®, JavaScript®, Flash®, XML, and so forth. The web server 1432 may include a mail server or other messaging functionality for receiving and routing messages between the social networking system 1430 and one or more user devices 1410. The messages can be instant messages, queued messages (e.g., email), text and SMS messages, or any other suitable messaging format.

The API request server 1434 allows one or more external systems 1420 and user devices 1410 to call access information from the social networking system 1430 by calling one or more API functions. The API request server 1434 may also allow external systems 1420 to send information to the social networking system 1430 by calling APIs. The external system 1420, in one embodiment, sends an API request to the social networking system 1430 via the network 1450, and the API request server 1434 receives the API request. The API request server 1434 processes the request by calling an API associated with the API request to generate an appropriate response, which the API request server 1434 communicates to the external system 1420 via the network 1450. For example, responsive to an API request, the API request server 1434 collects data associated with a user, such as the user's connections that have logged into the external system 1420, and communicates the collected data to the external system 1420. In another embodiment, the user device 1410 communicates with the social networking system 1430 via APIs in the same manner as external systems 1420.

The action logger 1440 is capable of receiving communications from the web server 1432 about user actions on and/or off the social networking system 1430. The action logger 1440 populates the activity log 1442 with information about user actions, enabling the social networking system 1430 to discover various actions taken by its users within the social networking system 1430 and outside of the social networking system 1430. Any action that a particular user takes with respect to another node on the social networking system 1430 may be associated with each user's account, through information maintained in the activity log 1442 or in a similar database or other data repository. Examples of actions taken by a user within the social networking system 1430 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 1430, the action is recorded in the activity log 1442. In one embodiment, the social networking system 1430 maintains the activity log 1442 as a database of entries. When an action is taken within the social networking system 1430, an entry for the action is added to the activity log 1442. The activity log 1442 may be referred to as an action log.

Additionally, user actions may be associated with concepts and actions that occur within an entity outside of the social networking system 1430, such as an external system 1420 that is separate from the social networking system 1430. For example, the action logger 1440 may receive data describing a user's interaction with an external system 1420 from the web server 1432. In this example, the external system 1420 reports a user's interaction according to structured actions and objects in the social graph.

Other examples of actions where a user interacts with an external system 1420 include a user expressing an interest in an external system 1420 or another entity, a user posting a comment to the social networking system 1430 that discusses an external system 1420 or a web page 1422a within the external system 1420, a user posting to the social networking system 1430 a Uniform Resource Locator (URL) or other identifier associated with an external system 1420, a user attending an event associated with an external system 1420, or any other action by a user that is related to an external system 1420. Thus, the activity log 1442 may include actions describing interactions between a user of the social networking system 1430 and an external system 1420 that is separate from the social networking system 1430.

The authorization server 1444 enforces one or more privacy settings of the users of the social networking system 1430. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 1420, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 1420. One embodiment allows the specification of the set of entities to comprise an enumeration of entities. For example, the user may provide a list of external systems 1420 that are allowed to access certain information. Another embodiment allows the specification to comprise a set of entities along with exceptions that are not allowed to access the information. For example, a user may allow all external systems 1420 to access the user's work information, but specify a list of external systems 1420 that are not allowed to access the work information. Certain embodiments call the list of exceptions that are not allowed to access certain information a "block list". External systems 1420 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 1444 contains logic to determine if certain information associated with a user can be accessed by a user's friends, external systems 1420, and/or other applications and entities. The external system 1420 may need authorization from the authorization server 1444 to access the user's more private and sensitive information, such as the user's work phone number. Based on the user's privacy settings, the authorization server 1444 determines if another user, the external system 1420, an application, or another entity is allowed to access information associated with the user, including information about actions taken by the user.

In some embodiments, the social networking system 1430 can include a content provider module 1446. The content provider module 1446 can, for example, be implemented as the content provider module 102 of FIG. 1. As discussed previously, it should be appreciated that there can be many variations or other possibilities.

Hardware Implementation

Figure 15:
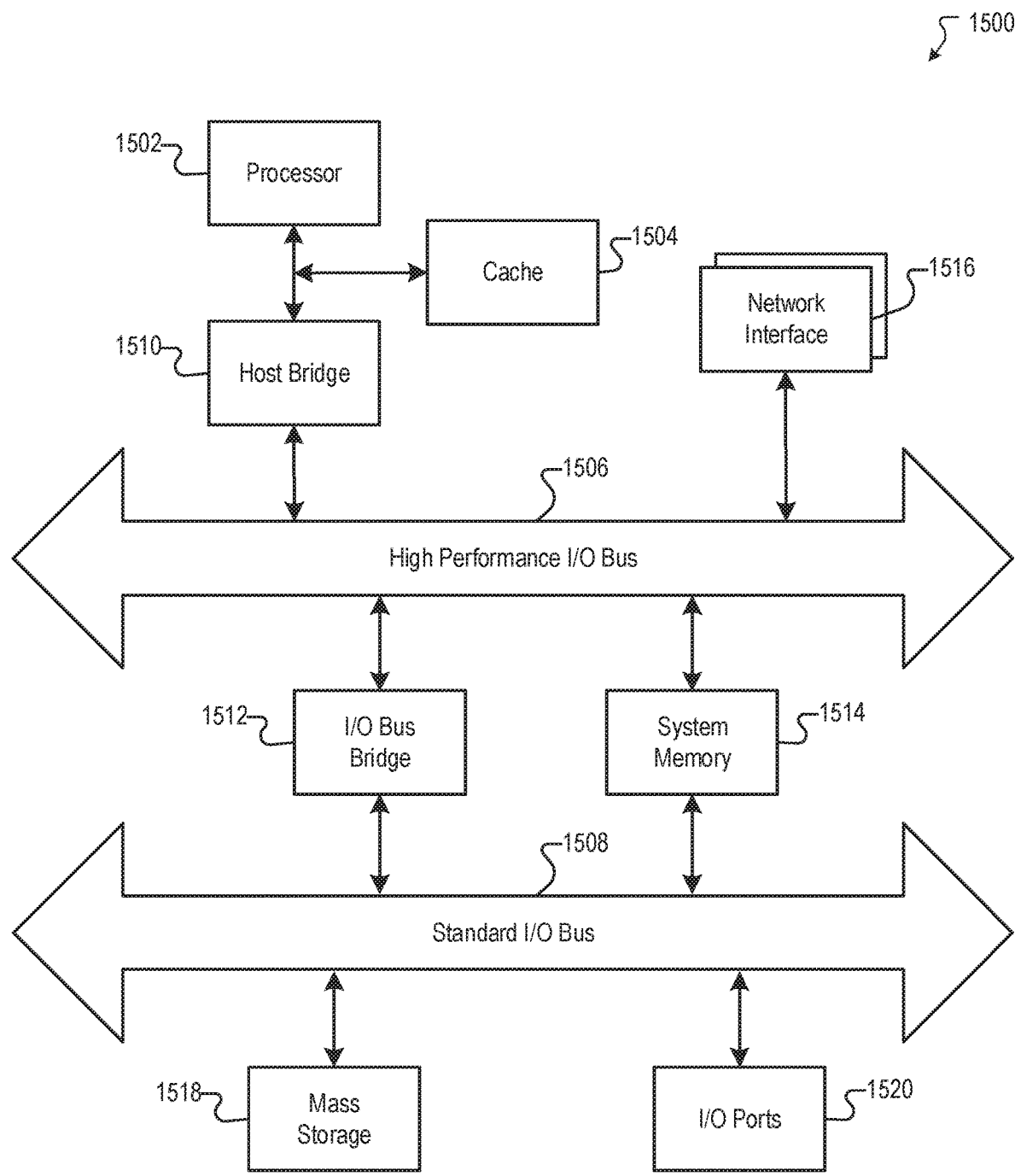
FIG. 15 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 15 illustrates an example of a computer system 1500 that may be used to implement one or more of the embodiments described herein in accordance with an embodiment of the invention. The computer system 1500 includes sets of instructions for causing the computer system 1500 to perform the processes and features discussed herein. The computer system 1500 may be connected (e.g., networked) to other machines. In a networked deployment, the computer system 1500 may operate in the capacity of a server machine or a client machine in a client-server network environment, or as a peer machine in a peer-to-peer (or distributed) network environment. In an embodiment of the invention, the computer system 1500 may be the social networking system 1430, the user device 1410, and the external system 1520, or a component thereof. In an embodiment of the invention, the computer system 1500 may be one server among many that constitutes all or part of the social networking system 1430.

The computer system 1500 includes a processor 1502, a cache 1504, and one or more executable modules and drivers, stored on a computer-readable medium, directed to the processes and features described herein. Additionally, the computer system 1500 includes a high performance input/output (I/O) bus 1506 and a standard I/O bus 1508. A host bridge 1510 couples processor 1502 to high performance I/O bus 1506, whereas I/O bus bridge 1512 couples the two buses 1506 and 1508 to each other. A system memory 1514 and one or more network interfaces 1516 couple to high performance I/O bus 1506. The computer system 1500 may further include video memory and a display device coupled to the video memory (not shown). Mass storage 1518 and I/O ports 1520 couple to the standard I/O bus 1508. The computer system 1500 may optionally include a keyboard and pointing device, a display device, or other input/output devices (not shown) coupled to the standard I/O bus 1508. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1500, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1500 are described in greater detail below. In particular, the network interface 1516 provides communication between the computer system 1500 and any of a wide range of networks, such as an Ethernet (e.g., IEEE 802.3) network, a backplane, etc. The mass storage 1518 provides permanent storage for the data and programming instructions to perform the above-described processes and features implemented by the respective computing systems identified above, whereas the system memory 1514 (e.g., DRAM) provides temporary storage for the data and programming instructions when executed by the processor 1502. The I/O ports 1520 may be one or more serial and/or parallel communication ports that provide communication between additional peripheral devices, which may be coupled to the computer system 1500.

The computer system 1500 may include a variety of system architectures, and various components of the computer system 1500 may be rearranged. For example, the cache 1504 may be on-chip with processor 1502. Alternatively, the cache 1504 and the processor 1502 may be packed together as a "processor module", with processor 1502 being referred to as the "processor core". Furthermore, certain embodiments of the invention may neither require nor include all of the above components. For example, peripheral devices coupled to the standard I/O bus 1508 may couple to the high performance I/O bus 1506. In addition, in some embodiments, only a single bus may exist, with the components of the computer system 1500 being coupled to the single bus. Moreover, the computer system 1500 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1500 that, when read and executed by one or more processors, cause the computer system 1500 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1500, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1502. Initially, the series of instructions may be stored on a storage device, such as the mass storage 1518. However, the series of instructions can be stored on any suitable computer readable storage medium. Furthermore, the series of instructions need not be stored locally, and could be received from a remote storage device, such as a server on a network, via the network interface 1516. The instructions are copied from the storage device, such as the mass storage 1518, into the system memory 1514 and then accessed and executed by the processor 1502. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1500 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
storing, by a computing system, fingerprint data corresponding to one or more content items in an index data structure, the index data structure comprising a set of bins, wherein at least one first bin references a list of fingerprinted frames, and wherein at least one fingerprinted frame in the list is associated with information identifying a first content item and an offset that identifies a portion of the first content item from which the at least one fingerprinted frame was generated; and
managing, by the computing system, the index data structure, wherein the managing further comprises:
determining, by the computing system, that no fingerprinted frames associated with the first content item matched fingerprinted frames associated with a plurality of test content items over a pre-defined period of time; and
removing, by the computing system, fingerprinted frames associated with the first content item from the index data structure in response to determining that no fingerprinted frames associated with the first content item matched fingerprinted frames associated with the plurality of test content items over the pre-defined period of time, wherein the removed fingerprinted frames include the at least one fingerprinted frame associated with information identifying the first content item.

2. The computer-implemented method of claim 1, further comprising:
determining, by the computing system, at least one fingerprinted frame corresponding to a second content item to be added to the index data structure;

identifying, by the computing system, the first bin based at least in part on a portion of bits that correspond to the at least one fingerprinted frame of the second content item; and storing, by the computing system, data describing the at least one fingerprinted frame of the second content item in the list of fingerprinted frames.

3. The computer-implemented method of claim 2, wherein the index data structure is restricted to storing fingerprint data for a specified number of content items, and wherein the method further comprises:

determining, by the computing system, that the index data structure is storing fingerprinted frames for the specified number of content items; and removing, by the computing system, fingerprinted frames corresponding to an identified content item from the index data structure to create space for the at least one fingerprinted frame of the second content item.

4. The computer-implemented method of claim 3, wherein removing the fingerprint frames corresponding to the identified content item further comprises:

determining, by the computing system, that the identified content item is no longer available for access by users through the computing system.

5. The computer-implemented method of claim 3, wherein removing the fingerprint frames corresponding to the identified content item further comprises:

determining, by the computing system, that one or more fingerprinted frames corresponding to the identified content item have been stored in the index data structure for a threshold period of time.

6. The computer-implemented method of claim 3, wherein removing the fingerprint frames corresponding to the identified content item further comprises:

determining, by the computing system, that the identified content item has a popularity value that is below a threshold popularity value.

7. The computer-implemented method of claim 6, wherein the popularity value is determined based at least in part on one of: a number of matches between one or more fingerprinted frames of the identified content item and fingerprinted frames of one or more test content items, a number of times the identified content item was accessed by users of the computing system, or a number of times users have engaged with the identified content item.

8. A system comprising:

at least one processor; and a memory storing instructions that, when executed by the at least one processor, cause the system to perform:

storing fingerprint data corresponding to one or more content items in an index data structure, the index data structure comprising a set of bins, wherein at least one first bin references a list of fingerprinted frames, and wherein at least one fingerprinted frame in the list is associated with information identifying a first content item and an offset that identifies a portion of the first content item from which the at least one fingerprinted frame was generated; and managing the index data structure, wherein the managing further comprises:

determining that no fingerprinted frames associated with the first content item matched fingerprinted frames associated with a plurality of test content items over a pre-defined period of time; and removing fingerprinted frames associated with the first content item from the index data structure in response to determining that no fingerprinted frames associated with the first content item matched fingerprinted frames associated with the plurality of test content items over the pre-defined period of time, wherein the removed fingerprinted frames include the at least one fingerprinted frame associated with information identifying the first content item.

9. The system of claim 8, wherein the instructions further cause the system to perform:

determining at least one fingerprinted frame corresponding to a second content item to be added to the index data structure;

identifying the first bin based at least in part on a portion of bits that correspond to the at least one fingerprinted frame of the second content item; and storing data describing the at least one fingerprinted frame of the second content item in the list of fingerprinted frames.

10. The system of claim 9, wherein the index data structure is restricted to storing fingerprint data for a specified number of content items, and wherein the instructions further cause the system to perform:

determining that the index data structure is storing fingerprinted frames for the specified number of content items; and removing fingerprinted frames corresponding to an identified content item from the index data structure to create space for the at least one fingerprinted frame of the second content item.

11. The system of claim 10, wherein removing the fingerprint frames corresponding to the identified content item further causes the system to perform:

determining that the identified content item is no longer available for access by users through the computing system.

12. The system of claim 10, wherein removing the fingerprint frames corresponding to the identified content item further causes the system to further perform:

determining that one or more fingerprinted frames corresponding to the identified content item have been stored in the index data structure for a threshold period of time.

13. A non-transitory computer-readable storage medium including instructions that, when executed by at least one processor of a computing system, cause the computing system to perform a method comprising:

storing fingerprint data corresponding to one or more content items in an index data structure, the index data structure comprising a set of bins, wherein at least one first bin references a list of fingerprinted frames, and wherein at least one fingerprinted frame in the list is associated with information identifying a first content item and an offset that identifies a portion of the first content item from which the at least one fingerprinted frame was generated; and managing the index data structure, wherein the managing further comprises:

determining that no fingerprinted frames associated with the first content item matched fingerprinted frames associated with a plurality of test content items over a pre-defined period of time; and removing fingerprinted frames associated with the first content item from the index data structure in response to determining that no fingerprinted frames associated with the first content item matched fingerprinted frames associated with the plurality of test content items over the pre-defined period of time, wherein the removed fingerprinted frames include the at least one fingerprinted frame associated with information identifying the first content item.

14. The non-transitory computer-readable storage medium of claim 13, wherein the instructions further cause the computing system to perform:
   determining at least one fingerprinted frame corresponding to a second content item to be added to the index data structure;
   identifying the first bin based at least in part on a portion of bits that correspond to the at least one fingerprinted frame of the second content item; and
   storing data describing the at least one fingerprinted frame of the second content item in the list of fingerprinted frames.

15. The non-transitory computer-readable storage medium of claim 14, wherein the index data structure is restricted to storing fingerprint data for a specified number of content items, and wherein the instructions further cause the computing system to perform:
   determining that the index data structure is storing fingerprinted frames for the specified number of content items; and
   removing fingerprinted frames corresponding to an identified content item from the index data structure to create space for the at least one fingerprinted frame of the second content item.

16. The non-transitory computer-readable storage medium of claim 14, wherein removing the fingerprint frames corresponding to the identified content item further causes the computing system to perform:
   determining that the identified content item is no longer available for access by users through the computing system.

17. The non-transitory computer-readable storage medium of claim 16, wherein removing the fingerprint frames corresponding to the identified content item further causes the computing system to perform:
   determining that one or more fingerprinted frames corresponding to the identified content item have been stored in the index data structure for a threshold period of time.

* * * * *